(12) United States Patent
Fossato et al.

(10) Patent No.: US 11,597,469 B2
(45) Date of Patent: Mar. 7, 2023

(54) BICYCLE CRANKARM PROVIDED WITH ELECTRIC/ELECTRONIC SYSTEM

(71) Applicant: Campagnolo S.r.l., Vicenza (IT)

(72) Inventors: Fabiano Fossato, Campagna Lupia (IT); Keith Joseph Wakeham, Calgary (CA)

(73) Assignee: Campagnolo S.r.l., Vicenza (IT)

( * ) Notice: Subject to any disclaimer, the term of this patent is extended or adjusted under 35 U.S.C. 154(b) by 388 days.

(21) Appl. No.: 16/407,901

(22) Filed: May 9, 2019

(65) Prior Publication Data

US 2019/0344857 A1 Nov. 14, 2019

(30) Foreign Application Priority Data

May 11, 2018 (IT) .......................... 102018000005294
Jul. 17, 2018 (IT) .......................... 102018000007266

(51) Int. Cl.
| | | |
|---|---|---|
| *B62M 3/00* | (2006.01) | |
| *B62M 6/55* | (2010.01) | |
| *B62M 6/50* | (2010.01) | |
| *B62M 6/90* | (2010.01) | |
| *B62J 43/30* | (2020.01) | |
| *B62J 45/20* | (2020.01) | |

(52) U.S. Cl.
CPC ................ *B62M 3/00* (2013.01); *B62J 43/30* (2020.02); *B62M 6/50* (2013.01); *B62M 6/55* (2013.01); *B62M 6/90* (2013.01); *B62J 45/20* (2020.02)

(58) Field of Classification Search
CPC . B62M 6/50; B62M 6/45; B62M 6/55; B62M 6/90; B62J 45/20; B62J 45/40; G01L 3/24
See application file for complete search history.

(56) References Cited

U.S. PATENT DOCUMENTS

| | | |
|---|---|---|
| 5,016,478 A | 5/1991 | Mercat |
| 5,027,303 A | 6/1991 | Witte |
| 5,319,522 A | 6/1994 | Mehta |
| 5,613,407 A | 3/1997 | Ogata |
| 6,296,072 B1 | 10/2001 | Turner |
| 6,321,734 B1 | 11/2001 | Kaminaga et al. |
| 7,258,040 B2 | 8/2007 | Valle et al. |
| 7,647,837 B2 | 1/2010 | Moran et al. |

(Continued)

FOREIGN PATENT DOCUMENTS

| | | |
|---|---|---|
| CN | 1724307 A | 1/2006 |
| CN | 1753950 A | 3/2006 |

(Continued)

OTHER PUBLICATIONS

Italian Search Report and Written Opinion in Italian Application No. 102018000005294, dated Jan. 15, 2019, with English translation.

(Continued)

*Primary Examiner* — Kevin Hurley
*Assistant Examiner* — Michael R Stabley
(74) *Attorney, Agent, or Firm* — Volpe Koenig

(57) ABSTRACT

A bicycle crankarm provided with an electric/electronic system, including a battery power unit, a processor having a standby mode and a running mode, and a wake unit that emits a wake signal of the processor, wherein the wake unit is completely supported by or in the crankarm.

19 Claims, 14 Drawing Sheets

(56) References Cited

U.S. PATENT DOCUMENTS

| | | | |
|---|---|---|---|
| 8,006,574 B2 | 8/2011 | Meyer | |
| 8,065,926 B2 | 11/2011 | Meyer | |
| 8,096,173 B2 | 1/2012 | Isono | |
| 8,529,476 B2 | 9/2013 | Govari | |
| 8,800,389 B2 | 8/2014 | Tetsuka | |
| 8,852,130 B2 | 10/2014 | Govari | |
| 8,863,616 B2 | 10/2014 | Ciavatta et al. | |
| 8,881,608 B2 | 11/2014 | Tetsuka | |
| 9,010,201 B2 * | 4/2015 | Kodama | G01L 3/1457 73/862.69 |
| 9,097,598 B2 | 8/2015 | Grassi | |
| 9,182,304 B2 | 11/2015 | Namiki et al. | |
| 9,221,440 B2 | 12/2015 | Drennen | |
| 9,254,588 B1 | 2/2016 | Chao et al. | |
| 9,291,512 B2 | 3/2016 | Schricker et al. | |
| 9,310,264 B2 | 4/2016 | David | |
| 9,322,725 B2 | 4/2016 | Tetsuka | |
| 9,354,129 B2 | 5/2016 | Boudet | |
| 9,417,144 B2 | 8/2016 | Lull et al. | |
| 9,423,310 B2 | 8/2016 | Tetsuka | |
| 9,459,167 B2 | 10/2016 | Heinkel et al. | |
| 9,476,294 B2 | 10/2016 | Harman | |
| 9,488,668 B2 | 11/2016 | Bailey et al. | |
| 9,551,623 B2 | 1/2017 | Beirmann | |
| 9,580,138 B2 | 2/2017 | Tetsuka et al. | |
| 9,581,508 B2 | 2/2017 | Tetsuka | |
| 9,599,526 B2 | 3/2017 | Mercat | |
| 9,784,628 B1 | 10/2017 | Jennings et al. | |
| 9,810,593 B2 | 11/2017 | Carrasco | |
| 9,829,402 B2 | 11/2017 | Beason et al. | |
| 9,919,616 B2 * | 3/2018 | Watarai | B62M 25/08 |
| 9,969,451 B2 | 5/2018 | Sasaki | |
| 10,000,253 B1 | 6/2018 | Tetsuka | |
| 10,076,681 B2 | 9/2018 | Lull | |
| 10,279,864 B2 | 5/2019 | Collen et al. | |
| 10,286,978 B1 | 5/2019 | Chen | |
| 10,458,788 B2 | 10/2019 | Fyfe et al. | |
| 10,458,868 B2 | 10/2019 | Tetsuka et al. | |
| 10,571,349 B2 | 2/2020 | Lull et al. | |
| 10,591,371 B2 | 3/2020 | D'Elia | |
| 10,605,320 B2 | 3/2020 | Kuwayama | |
| 2003/0093173 A1 | 5/2003 | Farnworth et al. | |
| 2003/0137046 A1 | 7/2003 | Kageyama | |
| 2005/0145061 A1 | 7/2005 | Ording et al. | |
| 2005/0199092 A1 | 9/2005 | Feltrin et al. | |
| 2007/0186719 A1 | 8/2007 | Ciavatta et al. | |
| 2007/0199403 A1 | 8/2007 | Ciavatta et al. | |
| 2007/0231955 A1 | 10/2007 | Liu | |
| 2008/0236293 A1 | 10/2008 | Meggiolan | |
| 2008/0257056 A1 | 10/2008 | Smetana | |
| 2008/0314193 A1 | 12/2008 | Meggiolan | |
| 2009/0119032 A1 | 5/2009 | Meyer | |
| 2009/0120210 A1 | 5/2009 | Phillips et al. | |
| 2010/0162830 A1 | 7/2010 | Meuter | |
| 2010/0220963 A1 | 9/2010 | Tamura et al. | |
| 2010/0242273 A1 | 9/2010 | Sugimoto et al. | |
| 2010/0263468 A1 | 10/2010 | Fisher et al. | |
| 2011/0135474 A1 | 6/2011 | Thulke | |
| 2012/0150377 A1 | 6/2012 | Buchheim et al. | |
| 2012/0169154 A1 | 7/2012 | Curodeau | |
| 2012/0214646 A1 | 8/2012 | Lull et al. | |
| 2012/0234108 A1 | 9/2012 | Janecek et al. | |
| 2012/0330572 A1 | 12/2012 | Longman | |
| 2013/0047723 A1 | 2/2013 | Tacx | |
| 2013/0205916 A1 | 8/2013 | Kodama et al. | |
| 2013/0283969 A1 | 10/2013 | Watarai | |
| 2013/0333489 A1 | 12/2013 | David et al. | |
| 2014/0060212 A1 | 3/2014 | Tetsuka et al. | |
| 2014/0200835 A1 | 7/2014 | Carrasco Vergara | |
| 2015/0239499 A1 | 8/2015 | Lan et al. | |
| 2015/0247767 A1 | 9/2015 | Tetsuka | |
| 2016/0003696 A1 | 1/2016 | Longman et al. | |
| 2016/0031523 A1 | 2/2016 | Tetsuka et al. | |
| 2016/0052583 A1 | 2/2016 | Sasaki | |
| 2016/0295702 A1 | 10/2016 | Heikkinen et al. | |
| 2016/0311491 A1 | 10/2016 | Watarai | |
| 2017/0127581 A1 | 5/2017 | Figueredo et al. | |
| 2017/0176275 A1 | 6/2017 | Tetsuka et al. | |
| 2017/0232674 A1 | 8/2017 | Mark | |
| 2017/0247078 A1 | 8/2017 | Tetsuka | |
| 2017/0248420 A1 | 8/2017 | Fyfe et al. | |
| 2017/0271722 A1 | 9/2017 | Ehm et al. | |
| 2017/0356816 A1 | 12/2017 | D'Elia et al. | |
| 2018/0011122 A1 | 1/2018 | Nichols et al. | |
| 2018/0290714 A1 | 10/2018 | Fossato et al. | |
| 2019/0099119 A1 | 4/2019 | Wakeham | |
| 2019/0201736 A1 | 7/2019 | Lin et al. | |
| 2019/0257703 A1 | 8/2019 | Caltabiano | |
| 2019/0320539 A1 | 10/2019 | Moeller | |
| 2020/0180353 A1 | 6/2020 | Clark et al. | |

FOREIGN PATENT DOCUMENTS

| | | | |
|---|---|---|---|
| CN | 101201284 A | 6/2008 | |
| CN | 101290026 A | 10/2008 | |
| CN | 101327828 A | 12/2008 | |
| CN | 201201674 Y | 3/2009 | |
| CN | 201707167 U | 1/2011 | |
| CN | 102589772 A | 7/2012 | |
| CN | 103612702 A | 3/2014 | |
| CN | 103674384 A | 3/2014 | |
| CN | 204527067 U | 8/2015 | |
| CN | 205156906 U | 4/2016 | |
| CN | 205352592 U | 6/2016 | |
| CN | 106003753 A | 10/2016 | |
| CN | 106335591 A | 1/2017 | |
| CN | 205971719 U | 2/2017 | |
| CN | 106965901 A | 7/2017 | |
| CN | 107290086 A | 10/2017 | |
| CN | 107585252 A | 1/2018 | |
| CN | 207019821 * | 2/2018 | G01L 3/24 |
| CN | 207019821 U | 2/2018 | |
| EP | 1 486 413 A2 | 12/2004 | |
| EP | 1 818 252 A1 | 8/2007 | |
| EP | 1 978 342 A2 | 10/2008 | |
| EP | 1 407 239 B1 | 1/2009 | |
| EP | 2 058 637 A2 | 5/2009 | |
| EP | 2213438 A1 | 8/2010 | |
| EP | 2805141 B1 | 11/2014 | |
| JP | H08145824 A | 6/1996 | |
| JP | 2018505816 A | 3/2018 | |
| TW | M445546 U | 1/2013 | |
| TW | 201307145 A | 2/2013 | |
| TW | 201336738 A | 9/2013 | |
| TW | 201615477 A1 | 5/2016 | |
| WO | 2011/030215 A1 | 3/2011 | |
| WO | 2014009381 A1 | 1/2014 | |
| WO | 2015022687 A1 | 2/2015 | |
| WO | 2015/095933 A1 | 7/2015 | |
| WO | 2016/030859 A1 | 3/2016 | |
| WO | 2017/165448 A1 | 9/2017 | |

OTHER PUBLICATIONS

Italian Search Report and Written Opinion in Italian Application No. 102018000005297, dated Mar. 4, 2019, with English translation.
Italian Search Report and Written Opinion in Italian Application No. 102018000005299, dated Jan. 21, 2019, with English translation.
Italian Search Report and Written Opinion in Italian Application No. 102018000005302, dated Jan. 23, 2019, with English translation.
Italian Search Report and Written Opinion in Italian Application No. 102018000007266, dated Mar. 22, 2019, with English translation.
Ron/Spinningmagnets; "Electric bicycles are adopting a new standard for connectors: electricbike.com"; published on Dec. 6, 2013. Retrieved from the Internet: URL: https://www.electricbike.com/ropdenergybus-charging-port-standard/ (accessed on May 3, 2019).
Chinese Office Action for Application No. 201910389220.0, dated Aug. 11, 2021, with English translation.
Chinese Office Action for Application No. 201910388132.9, dated Aug. 17, 2021, with English translation.
Taiwanese Office Action dated Jul. 19, 2022 for Taiwan Patent Application No. 108115487.

(56) References Cited

OTHER PUBLICATIONS

Chinese Office Acton for Application No. 201910388492.9, dated Jan. 12, 2022. English translation attached.
Chinese Office Acton for Application No. 201910389220.0, dated Jan. 21, 2022. English translation attached.
Chinese Office Action for Chinese Application No. 201910388132.9, dated Mar. 28, 2022. English translation attached.
Chinese Notification of Grant dated Jul. 20, 2022 for Chinese Patent Application No. 201910389220.0.
Taiwanese Office Action and Search Report dated Aug. 23, 2022 for Taiwan Patent Application No. 108115485.
Internet Literature Ron/Spinningmagnets Rosenberger "Charge Connectors Make Ebike Charging Cooler than Ever" electricbike.com Dec. 7, 2013 (attached hereto is a word file showing the contents of the web page: https://www.electricbike.com/ropdenergybus-charging-port-standard/).
Taiwanese Office Action and Search Report dated Sep. 5, 2022 for Taiwan Patent Application No. 108115376.
Japanese Office Action for Application No. 2019-089044, dated Nov. 15, 2022. English translation attached.
Japanese Office Action for Application No. 2019-089045, dated Nov. 15, 2022. English translation attached.
Japanese Office Action for Application No. 2019-089043, dated Dec. 6, 2022.

\* cited by examiner

BICYCLE CRANKARM PROVIDED WITH ELECTRIC/ELECTRONIC SYSTEM

CROSS REFERENCE TO RELATED APPLICATIONS

This application claims the benefit of Italian Patent Application No. 102018000005294, filed on May 11, 2018, and Italian Patent Application No. 102018000007266, filed on Jul. 17, 2018, which are both incorporated herein by reference as if fully set forth.

FIELD OF INVENTION

The invention relates in general to the field of bicycles, and in particular to a bicycle crankarm.

BACKGROUND

Bicycles are increasingly equipped with one or more electric/electronic systems. A bicycle electric/electronic system of particular interest here is a torque or power meter. In the present description and in the attached claims, the term "torque meter" is meant to indicate an instrument for detecting the torque delivered by the cyclist; the term "power meter" is meant to indicate an instrument for detecting the pedaling power. A processor external to a torque meter can obtain power measurements by combining the output of a torque meter with the output of an (angular) speed meter.

Torque or power meters can be of the symmetrical type, comprising two sub-systems made at each crankarm of a crankset—wherein the crankset is the component of the transmission of a bicycle that converts the motion applied to the pedals by the cyclist in rotary motion used to move the transmission chain (in other cases, the belt), which in turn moves the rear wheel; alternatively, they can be of the non-symmetrical type, comprising a sub-system at the crankarm on the side of the movement transmission of the bicycle (chain or belt side, typically right side) and the other sub-system at the bottom bracket spindle of the crankset, or comprising a system made at only the crankarm on the transmission side.

In all cases, at least one crankarm of the crankset is provided with electric/electronic components forming, or being part of, the torque or power meter. The battery power units that power the electric/electronic components of the crankarm can be replaceable, rechargeable on-board or rechargeable while detached from the bicycle. In all cases, it is necessary to keep the energy consumption of the electric/electronic components as low as possible, in order to preserve the charge of the battery power unit and therefore the autonomy of the electric/electronic system.

For this purpose, the electric/electronic system can be provided—as well as possibly with an actual on/off switch—with a standby or waiter sleep or low-power mode.

European patent application no. 18165343.7, claiming priority of Italian application no. 102017000038213 and still secret at the date of first filing of the present patent application, discloses a bicycle manual control device for imparting at least one electric-electronic command to at least one bicycle equipment, comprising a support body, configured to be fixed to the bicycle; at least one manual actuation member supported in a movable manner by the support body; and on-board electronics having a standby mode and an operating mode, said manual control device further comprising a detector of movement of the bicycle configured to emit a wake signal to bring said on-board electronics from the standby mode to the operating mode. Preferably, the movement detector comprises a vibration sensor, for example embodied by a piezoelectric accelerometer, which detects the vibrations caused by irregularities in the road surface or in general by the motion of the bicycle transmission system. Alternatively, the movement detector can be embodied by another type of sensor, for example an inclinometer, a gyroscope, etc. Preferably, the movement detector also has a standby mode. The on-board electronics, once it has been brought into operating mode through the wake signal generated by the movement detector, can advantageously send the latter into standby mode. Alternatively, the movement detector can be configured to automatically enter standby mode immediately after the wake signal has been sent to the on-board electronics. In both cases, the on-board electronics is advantageously configured to remain in operating mode until a sleep condition has been reached, the movement detector then entering into operating mode.

The use of an accelerometer to measure the pedaling cadence in a power meter applied to a crankarm is in general known. An accelerometer is usually capable of generating an interrupt signal when it detects an acceleration (along one of its measurement axes) above a predetermined acceleration threshold.

US 2013/0205916 A1 discloses a measurement apparatus of the force applied to a man-powered machine, such as a bicycle, comprising: a strain detecting part that detects strain of a crank of the man-powered machine configured to transmit force being applied from a user through the crank and one gear selected among one or more gears; a sensor that detects the crank passing through a predetermined position; and a control part, wherein: the control part calculates a rotation angle of the crank based on an elapsed time from a time the crank passes through the predetermined position that the sensor has detected; the control part calculates force applied to the crank based on a strain amount of the crank that the strain detecting part has detected; and the control part associates the rotation angle with the force applied to the crank to calculate distribution of the force applied from the user.

The document relates in particular to a cadence meter wherein a magnetic reed sensor applied to the crankarm is activated by a magnet fixed to the frame when the crankarm passes, during its rotation, close to the magnet. This activation is used as "interrupt" signal to start up procedures at every turn of the crankarm or at every fraction of turn of the crankarm, taking the pedaling cadence into account. The control part, when awaiting such an interrupt, is indicated as in "sleep" and the emission of the interrupt signal is indicated as "wake"; however, in all states all of the components of the apparatus are always powered and are always in fully running mode, with normal energy consumption.

US 2016/0311491 A1 discloses a control system for a bicycle, comprising: a movement-information obtaining device configured to obtain movement information indicating a movement of at least part of a first bicycle portion and configured to wirelessly output the movement information; an actuator configured to actuate at least a second bicycle portion; an actuation controller having a wake mode to control the actuator based on an input signal and a sleep mode with electrical power consumption lower than an electrical power consumption in the wake mode; and a mode controller configured to wirelessly receive the movement information and configured to switch the actuation controller from the sleep mode to the wake mode based on the movement information.

The first part of bicycle, the movement of which results in waking, can be a pulley of the rear derailleur, a wheel, the chain, or a crankarm assembly. In the latter case, of interest herein, the movement information obtaining device can comprise a magnetic sensor mounted on the frame and a magnet mounted on the crankarm, or a torque sensor comprising strain gages or a magnetoresistive sensor. The second bicycle portion is a movable body of a derailleur, an adjustable saddle or an adjustable suspension; therefore, the controller that passes into sleep mode is external to the crankarm. Therefore, the possible electronics mounted on the crankarm must necessarily always remain in running mode to detect the movement of the crankarm itself in order to wake another bicycle component, in particular a derailleur.

More in particular, the actuation controller passes into a low-power light sleep mode if for a certain period of time movement is not detected; it passes into a deep sleep mode or off mode if for a longer period of time movement is not detected; it is kept in wake mode as long as movement is detected.

The control system can further comprise a vibration-information obtaining device configured to obtain vibration information indicating a vibration of the bicycle, wherein the mode controller is configured to switch the actuation controller from the sleep mode to the wake mode based on the movement information and the vibration information. In this case, waking from light or deep sleep mode to wake mode takes place when both movement and vibration are detected; on the other hand, the anti-sleep function is only carried out by the movement detector.

US 2010/0263468 A1 discloses a bicycle crankarm including a torque or power meter comprising a battery, a microcomputer and strain bridges stroboscopically powered in synchronism with the reading by a microcomputer. The microcomputer is furthermore provided with a reed switch that, when the crankarm rotates, is activated by a stationary magnet mounted on the frame of the bicycle. Activation of the Reed switch by the magnet serves to signal the microcomputer to remain in running mode and take continuous readings of the strain gages. When the Reed switch is not activated for a predetermined period of time, typically several minutes, the microcomputer program enters a sleep mode and puts the crank electronics into a shutdown phase, reducing the battery power required to a very low level. The microcomputer restarts again when the reed switch is activated. The crankarm can furthermore include a sensor or a magnet for use with determining the cadence. The document also provides for means such as a solid state gyro or an accelerometer, but only in order to measure the rotation angle of the crankarm, which in the basic configuration is measured through a potentiometer.

The technical problem at the basis of the invention is to provide a crankarm provided with an electric/electronic system, in particular a torque or power meter, which is totally autonomous ("self-contained"), not requiring any other element external to the crankarm for its operation, and which at the same time has sufficiently low energy consumption.

SUMMARY

A bicycle crankarm is disclosed. The crank arm includes an electric/electronic system including a battery power unit, a processor having a standby mode and a running mode, and a wake unit that emits a wake signal for the processor. The wake unit is completely supported by or in the crankarm.

BRIEF DESCRIPTION OF THE DRAWINGS

Further features and advantages of the invention will become clearer from the description of preferred embodiments thereof, made with reference to the attached drawings, wherein.

DETAILED DESCRIPTION OF THE PREFERRED EMBODIMENTS

Figure 1:
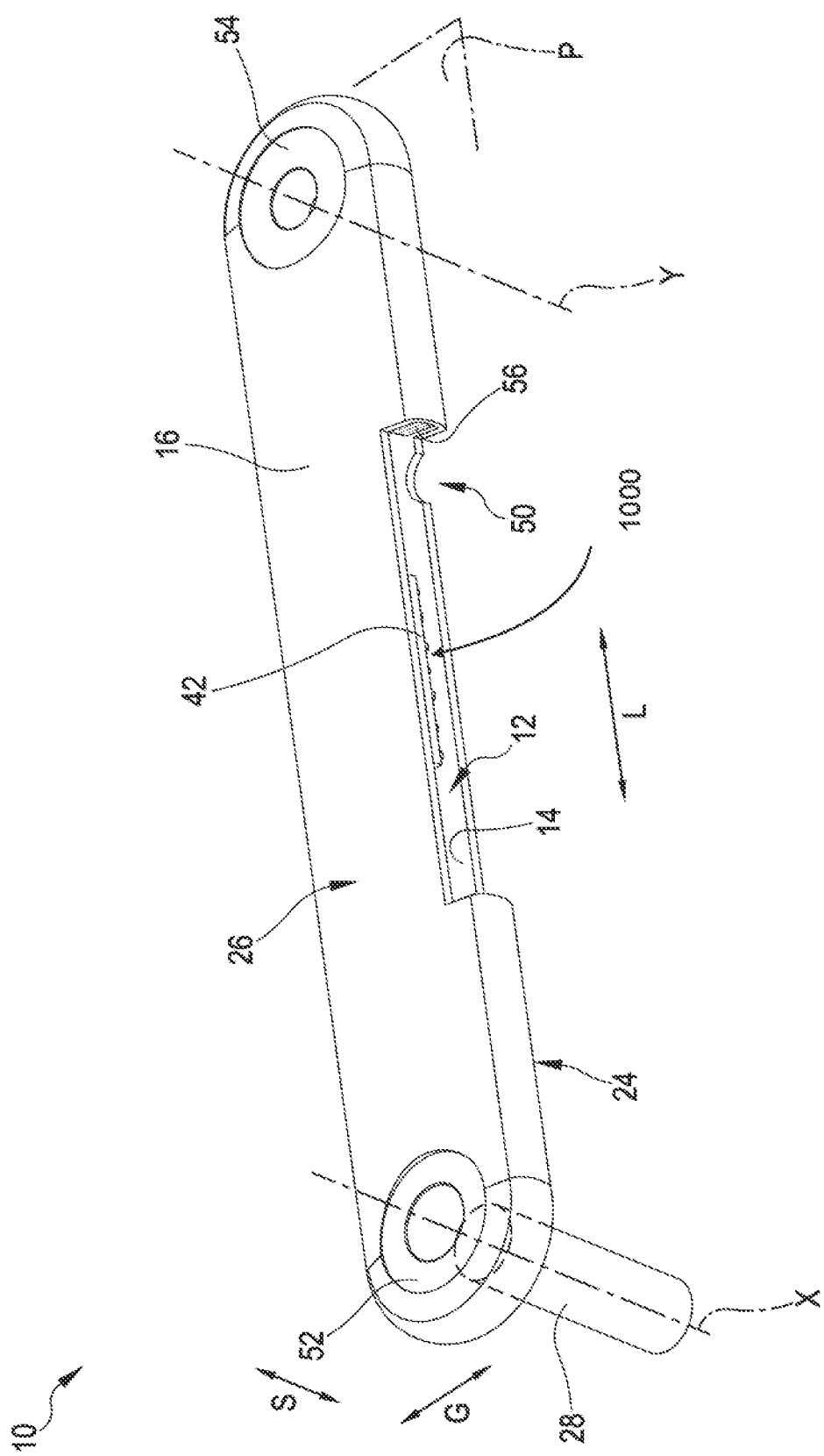
FIG. 1 schematically illustrates an embodiment of a bicycle crankarm, partially broken away.

In the present description and in the attached claims, under "standby mode", sometimes also indicated as sleep or wait or low-power mode, a condition in which an electric, electronic or electromechanical device is not operating, though is ready to switch from a state of temporary non-use to running mode, is meant to be indicated; in the standby mode, typically, only those circuits that allow the device to start up upon receiving commands or in general inputs that involve the actuation thereof are kept operating, so that there is low electrical energy consumption.

Vice-versa, in the present description and in the attached claims, under "running mode" of an electric, electronic or electromechanical device, a mode is meant to be indicated, in which the device is ready to receive commands or in general inputs and to perform tasks, even though it can be engaged only in waiting for commands and inputs, without performing any specific task.

The switching from a standby mode to a running mode is indicated, in the present description and in the attached claims, as wake of a device. More in general, under wake of a device, keeping a device in running mode, preventing it from entering into standby mode is meant to be encompassed. A same signal or a similar signal can be used in both cases.

In an aspect the invention relates to a bicycle crankarm provided with an electric/electronic system, including a battery power unit, a processor having a standby mode and a running mode, and a wake unit that emits a wake signal of the processor, characterized in that the wake unit is completely supported by or in the crankarm.

The wake unit preferably comprises a presumed use detector, which is more preferably selected from the group consisting of:
at least one vibration sensor;
at least one tilt sensor;
at least one self-contained magnetic field sensor;
at least one barometer;
at least one position and/or movement sensor, in particular a rotation sensor;
at least one force and/or pressure and/or mechanical stress sensor.

The presumed use detector is preferably a vibration sensor selected from an accelerometer and a ball-in-cage switch.

When the presumed use detector is an accelerometer, it is preferably selected from the group consisting of a piezoelectric effect accelerometer, a piezo-resistive effect accelerometer, a capacitive effect accelerometer, an accelerometer for measuring eddy currents.

When the electric/electronic system comprises a cadence detector, in particular being a power meter, the presumed use detector is particularly advantageously embodied by an accelerometer also forming part of the cadence detector.

Preferably, the wake unit comprises an actual use detector, alternatively or preferably additionally to the presumed use detector.

The actual use detector is preferably selected from the group consisting of:
at least one vibration sensor;
at least one tilt sensor;
at least one self-contained magnetic field sensor;
at least one barometer;
at least one position and/or movement sensor, in particular a rotation sensor;
at least one force and/or pressure and/or mechanical stress sensor.

When the actual use detector is a vibration sensor, this is selected from an accelerometer and a ball-in-cage switch.

When the actual use detector is an accelerometer, it is preferably selected from the group consisting of a piezoelectric effect accelerometer, a piezo-resistive effect accelerometer, a capacitive effect accelerometer, an accelerometer for measuring eddy currents.

When the electric/electronic system comprises a cadence detector, in particular being a power meter, the actual use detector is preferably embodied by an accelerometer also forming part of the cadence detector.

In a particularly advantageous manner, the presumed use detector and the actual use detector can be embodied by one same component of the wake unit, which is preferably an accelerometer also forming part of a cadence detector of the electric/electronic system, in particular of a power meter.

Preferably, said same component has a normal running mode and a low-power running mode, in the normal running mode acting as presumed use detector and as actual use detector, and in the low-power running mode acting as presumed use detector.

In the case of an accelerometer, it has, in the low-power running mode, a low precision of detection, lower than that in normal running mode and/or its output is read with a low sampling speed, lower than that in normal running mode, yet it is capable of generating an interrupt signal when it detects an acceleration (along one of its measurement axes) above a predetermined acceleration threshold, and therefore it is advantageously capable of acting as presumed use detector.

Preferably, the processor is configured to
after having entered into running mode, turn on the actual use detector on, respectively place said same component in the normal running mode and,
before entering into standby mode, turn the actual use detector off, respectively place said same component in the low-power mode.

Preferably, the crankarm further comprises a stress/strain detector.

Preferably, the stress/strain detector comprises at least one strain gage and related reading control unit.

Preferably, the stress/strain detector comprises at least one analog-to-digital converter.

The processor in this case is configured to generate a torque signal based on the signal of said stress/strain detector, respectively a power signal based on the signal of said stress/strain detector and the signal of said accelerometer.

Preferably, the processor is configured to turn the stress/strain detector on after having entered into running mode, and to turn the stress/strain detector off before entering into standby mode.

Preferably, the crankarm further comprises a communication module, preferably a radio, for communicating with an external component, in particular for communicating data such as the measured torque or power to an external processor.

Preferably, the processor is configured to turn the communication module on after having entered into running mode, and to turn the communication module off before entering into standby mode.

Preferably, the processor is configured to detect a movement of the crankarm, more preferably based on an output signal of said, respectively of an, actual use detector of said wake unit.

More preferably, it is a rotary movement of the crankarm.

In a particularly advantageous manner, it is the same rotary movement used by the cadence detector in the case of a power meter.

Preferably, the processor is configured to enter into standby mode when it does not detect any movement, preferably any rotation, of the crankarm for a time longer than a first threshold value.

More preferably, the processor is configured to enter into standby mode when it does not detect any movement, preferably any rotation, of the crankarm for a time longer than a first threshold value and than a second threshold value greater than the first threshold value.

By providing for two different threshold values, the processor may be prevented from going into standby during short periods of non-rotation (or other movement) of the crankarm, as for example can occur during downhill.

Even more preferably, the processor is configured to stay in running mode when it does not detect any movement, preferably any rotation, of the crankarm for a time longer than a first threshold value, but shorter than the second threshold value, preferably updating the cadence data accordingly in the case of a torque or power meter.

Preferably, alternatively or additionally, the processor is configured to ignore cadence data and/or torque data and/or power data, when said electric/electronic system is a torque or power meter, when it detects a rotary movement of the crankarm, but at a greater cadence than a predetermined maximum cadence, respectively a (rotary) movement time shorter than a predetermined minimum (rotary) movement time.

Through this provision it is avoided to distort cyclist performance data with accelerations due to vibrations instead of to an actual rotation of the crankarm. Such vibrations can for example be due to irregularity of the road surface, to a back and forth movement of the cyclist on the pedals, etc.

Preferably, the processor is configured to turn the communication module and/or the stress/strain detector on when it detects a (rotary) movement of the crankarm at a lower cadence than a predetermined maximum cadence, respectively a (rotary) movement time greater than a predetermined minimum movement time.

Through this provision, particularly useful when the wake unit comprises the accelerometer, the auxiliary electronics is prevented from being turned on falsely in the case of accelerations due to vibrations instead of to an actual rotation of the crankarm. Such vibrations can for example be due to the transportation of the bicycle, to the passage of vehicles next to the stationary bicycle, etc.

Preferably, the wake signal of the processor comprises an interrupt signal generated by the presumed use detector of the wake unit, preferably when it detects a movement, preferably acceleration, above a predetermined minimum movement threshold.

In embodiments in which the crankarm comprises an accelerometer and the processor is configured to measure a rotation cadence of the crankarm based on an output signal of the accelerometer, preferably said wake unit comprises said accelerometer and said wake signal of the processor is given by an interrupt signal generated by the accelerometer when it detects an acceleration, along at least one axis thereof, above a predetermined acceleration threshold.

More preferably, the wake unit controls all passages of state of the electric/electronic system among a running mode, a standby mode and a possible temporary mode based on an output signal of the accelerometer.

Preferably, the crankarm is monolithic and made of composite material comprising structural fiber incorporated in a polymeric matrix, the crankarm being co-molded with a printed circuit board carrying said wake unit.

In an aspect the invention relates to a bicycle crankarm incorporating a torque or power meter comprising a battery power unit, an accelerometer for measuring a rotation cadence, a stress/strain detector comprising at least one strain gage and related reading control unit, and a processor having a standby mode and a running mode, the processor being configured to generate a torque signal based on the signal of said stress/strain detector, respectively a power signal based on the signal of said stress/strain detector and the signal of said accelerometer, characterized in that an interrupt signal generated by the accelerometer when it detects an acceleration—along one of its measurement axes—above a predetermined acceleration threshold, is used as wake signal of the processor.

Advantageous aspects and features of the crankarm of this aspect correspond, mutatis mutantis, to the advantageous aspects and features of the crankarm of the first aspect of the invention.

In an aspect the invention relates to a method for controlling a torque or power detector associated with a bicycle crankarm, the torque or power detector comprising a battery power unit, a processor and a wake unit, the method comprising the steps, carried out by the processor, of:

a) waiting for a rotation of the crankarm calculating a time elapsed from a previous rotation of the crankarm, b) as long as the elapsed time is less than a first threshold value, continuing to wait for a rotation of the crankarm calculating said elapsed time, c) if the elapsed time becomes greater than the first threshold value, evaluating whether the elapsed time is greater than a second threshold value greater than the first threshold value and, in the affirmative case, entering into standby condition, the method further comprising the steps of:

d) detecting a rotation of the crankarm, e) if the calculated time elapsed from the previous rotation of the crankarm is greater than a minimum threshold value, obtaining torque or power data, f) if conversely the calculated time elapsed from the previous rotation of the crankarm is less than the minimum threshold value, ignoring torque or power data.

Preferably in said step e) it is further provided for turning a communication module and/or a stress/strain detector of said torque or power detector on, if they are still turned off.

Preferably, the method further comprises the steps of:

g) obtaining a signal indicative of presumed use of the bicycle from the wake unit, and h) entering into running mode in response to obtaining the signal of step g).

More preferably, step g) comprises detecting an acceleration of the crankarm above a predetermined threshold.

More preferably, the method comprises the steps of:

i) obtaining a signal indicative of presumed use of the bicycle from the wake unit, j) obtaining a signal indicative of actual use of the bicycle, preferably indicative of a rotation of the crankarm, and k) entering into totally running mode in response to obtaining both the signal of step i) and the signal of step j).

More preferably, the method comprises the step i1), carried out immediately after step i), of entering into a temporary mode in response to obtaining the signal of step g) and, if it does not obtain the signal of step j) within a predetermined time, returning to said step a).

More preferably, step i) comprises detecting an acceleration of the crankarm above a predetermined threshold.

A crankarm according to the invention comprises an electric/electronic system, which preferably is or comprises a torque or power meter, as better described hereinafter with reference to FIGS. 6-14.

A bicycle crankarm according to the invention may be made of composite material comprising structural fibers incorporated in a polymeric material.

Typically, the structural fiber is selected from the group consisting of carbon fibers, glass fibers, boron fibers, synthetic fibers, ceramic fibers and combinations thereof, carbon fibers being preferred.

Preferably, the synthetic fibers comprise polyoxazole fibers, for example Zylon®, ultra high molecular weight polyethylene fibers, for example Dyneema®, aramid fibers, for example kevlar fibers and combinations thereof.

Typically, the composite material is layered, and for each layer there is a vast choice of materials, in general known as Sheet Molding Compounds (SMCs).

However, the composite material could also not be layered.

By way of a non-limiting example, in the layered composite material, each layer can be selected, independently of the other layers, among a composite material with unidirectional fiber, with woven two-directional fiber, with non-woven two-directional fiber, with woven multi-directional fiber, with non-woven multi-directional fiber, with short or very short fiber having random orientation, with fiber conglomerates, and combinations thereof; as well as independently among a composite material with preimpregnated fiber ("prepreg") and a composite material with dry fiber, the polymeric matrix material being added during the molding process; as well as independently among a composite material with thermosetting polymeric matrix and a composite material with thermoplastic polymeric matrix; the choice in each group of alternatives being independent of the choice in each other group.

In the case of non-layered composite material, it can be selected among the various alternatives of each aforementioned group for the individual layers, but typically it is of the type with short or very short fiber having random orientation or with fiber conglomerates or combinations thereof.

In the layered composite material, each layer can comprise structural fibers oriented the same way or differently with respect to one or more other layers.

In a particularly preferred manner, the material used for manufacturing the crankarm is a compound with preimpregnated fiber, and comprises a polymeric matrix of the thermosetting type.

Manufacturing the crankarm from such a composite material with thermosetting polymeric matrix takes place through a compression molding process, while if the polymeric matrix is a thermoplastic one, it takes place through an injection molding process. Another process that can be used is thermoforming.

Figure 2:
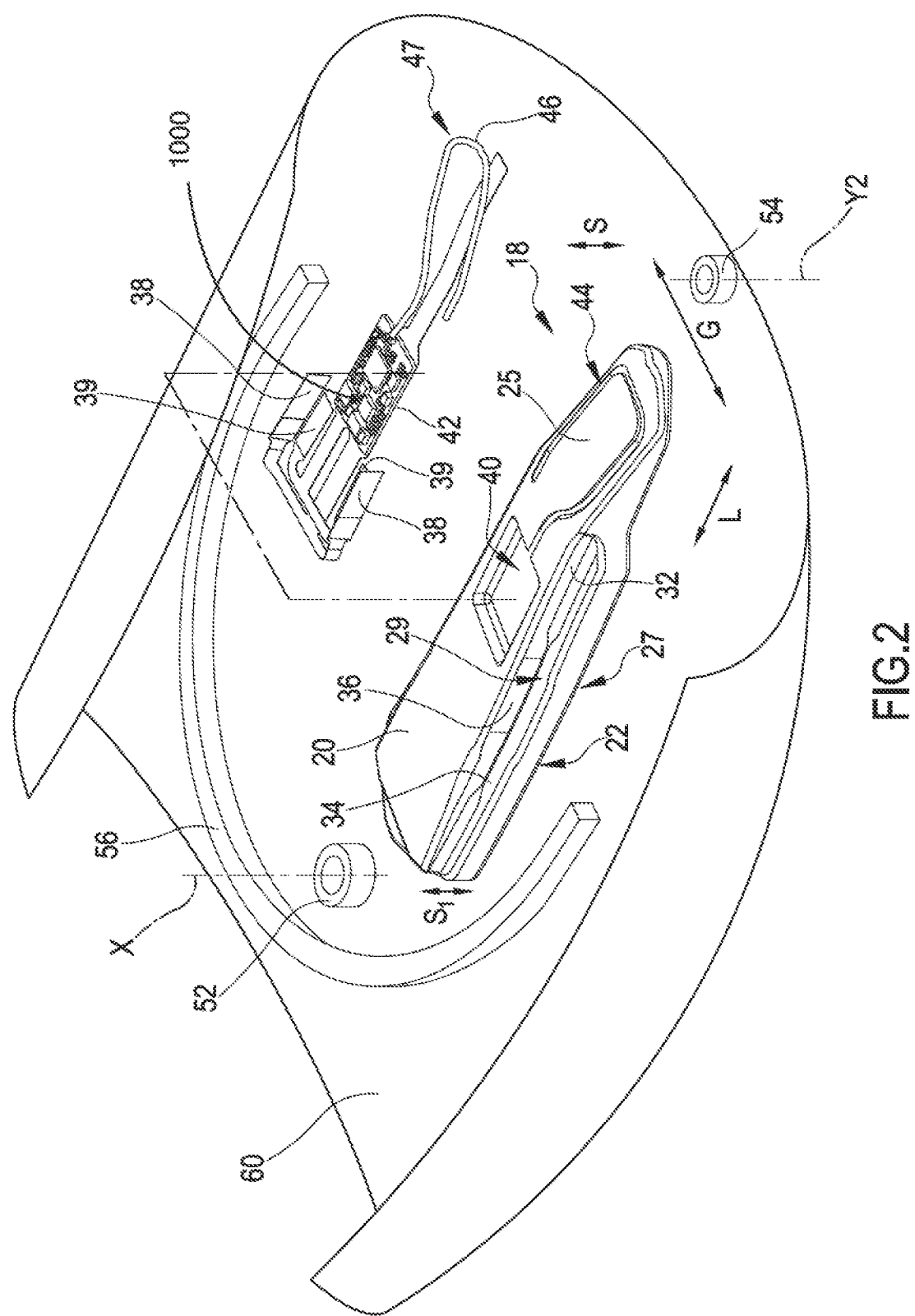
FIGS. 2-3 are perspective and exploded views of steps of a process according to the invention for manufacturing the crankarm of FIG. 1.
Figure 3:
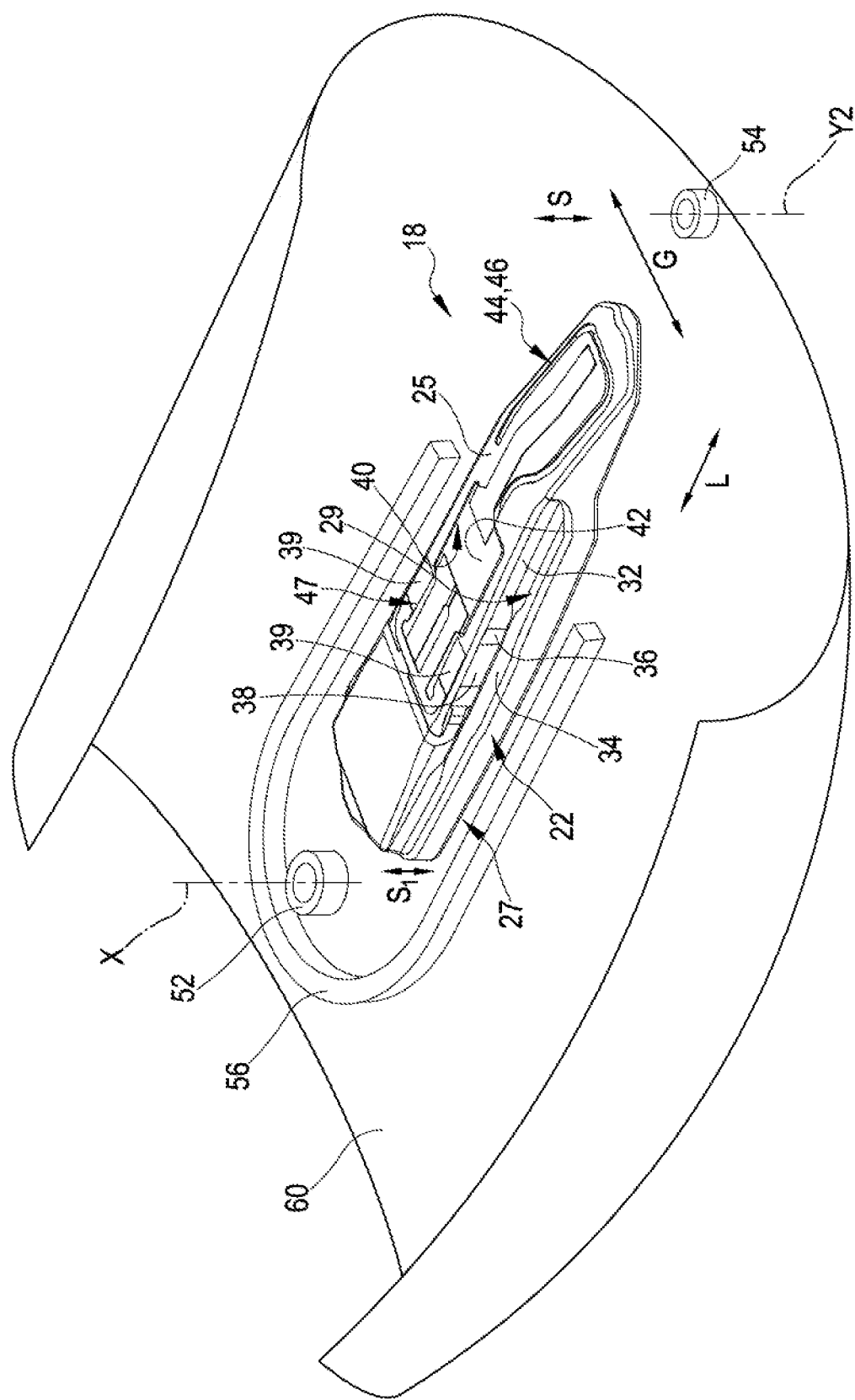

With reference to FIGS. 1 to 3, a hollow crankarm 10 is shown, in the finished state and in some steps of a manufacturing process.

The crankarm 10 is in particular a left crankarm—or more generally on the opposite side to the side of the transmission chain or belt—but what will be described also holds true for a right crankarm—or more generally on the side of the transmission chain or belt—; the changes to be brought about will be clear to those skilled in the art in the light of the present description, and in particular of the following description of FIGS. 4 and 5.

The crankarm 10 has an inner cavity 12 at least in part of an arm region or main body thereof extending between the rotation axis X and the pedal axis Y.

In the present description and in the attached claims, under longitudinal direction or length direction L of the crankarm 10, a direction orthogonally joining the rotation axis X to the pedal axis Y is meant to be indicated.

In the present description and in the attached claims, under width direction G of the crankarm 10, a direction lying in the rotation plane P and orthogonal to the length direction L of the crankarm 10 is meant to be indicated.

In the present description and in the attached claims, under thickness direction S of the crankarm 10, a direction parallel to the rotation axis X is meant to be indicated.

In the present description and in the attached claims, under proximal face 24 of the crankarm 10, the face that, in the mounted condition, faces towards the frame is meant to be indicated; under distal face 26 of the crankarm 10, the face opposite the proximal face 24 is meant to be indicated. The bottom bracket spindle 28 extends transversely from the proximal face 24, and the pedal pivot (not shown) extends transversely from the distal face 26.

In the present description and in the attached claims, in the case of a hollow crankarm 10, under inner surface 14 of the crankarm, the surface facing towards the cavity 12 is meant to be indicated; under outer surface 16 of the crankarm 10, the exposed surface is meant to be indicated.

In order to manufacture the hollow crankarm 10 a shaped rigid core 18 is used, the shape of which determines the shape of the cavity 12 inside the finished crankarm 10.

The expressions "length direction", "width direction", "thickness direction", "proximal face" and "distal face" are used with reference to the core 18 in an analogous way to what has been defined above with reference to the crankarm.

In particular the core 18, at least in a longitudinally central region thereof, has a first region 20 (central in the width direction) that has a maximum thickness S1 (constant or anyway little and steadily variable), and two projections from one side and the other in the width direction G, only one of which, indicated with reference numeral 22, is visible.

Each projection 22 is flush with a face of the core, preferably with the proximal face 27 of the core.

In the transition from each projection 22 to the central region 20, a step 29 is therefore defined, having a riser surface 32 and a "tread" surface 34, preferably orthogonal or approximately orthogonal to one another. The "tread" surface 34 is part of the projection 22 and extends substantially along the length direction L and along the width direction G. The riser surface 32 is part of the central region 30 and extends substantially along the length direction L and along the thickness direction S.

The core 18 comprises grooves and/or recesses intended to house electrical/electronic components in a predetermined and more protected position, like for example integrated circuit boards, flexible circuits and/or connection cables between electronic components internal and/or external to the finished crankarm.

In the case shown there are provided recesses 36 for sensors 38, in particular strain gages or other elongation/contraction sensors and/or temperature sensors, preferably on the riser surfaces 32 of the steps 29, a recess 40 for a printed circuit board or PCB 42, a recess 44 for cables and/or flexible circuits 46, preferably on the distal face 25, a circular recess (not visible) to define the position of an evacuation hole 50 (FIG. 1) described hereinafter, preferably on the proximal face 27.

In the manufacturing process of the hollow crankarm 10, indeed, one or more sensors 38 can first be fixed on the riser surface 32 of the rigid core 18, within the recesses 36. Said cables and/or flexible circuits 46 can also be fixed to the core 18.

The PCB 42, suitably protected as described hereinafter or more in general as described in Italian patent application 102018000005294, is fixed to the core 18, preferably in a stable, but temporary manner, within the recess 40. The meaning of the expression "stable, but temporary" will become clear upon reading the present description.

The PCB 42 advantageously carries a wake unit 1000 (or at least some components thereof), which will be better described hereinafter with reference to FIG. 6 and subsequent figures. Other components of the wake unit 1000, which are not housed on the PCB 42, can in any case be incorporated in the crankarm 10 in an analogous manner to what is described herein for the PCB 42 and the sensors 38 (and the sensors 39 mentioned hereinafter).

Advantageously, as shown, the components 38, 42, 46 form a pre-assembled instrumentation body 47; FIG. 3 shows the core 18 and the instrumentation body 47 in the fixing condition of the instrumentation body 47 to the core 18.

The instrumentation body 47 further has sensors 39, preferably temperature sensors when the sensors 38 are strain gages or other elongation/contraction sensors. It should be noted that the sensors 39 of the instrumentation body 47 are fixed on the distal face 25 of the core 18. However, there could be, alternatively or additionally to the recesses 36 on the riser surface 32 of the rigid core 18, recesses on the tread surface 34 of the steps 29 of the core 18 for receiving these sensors 39.

The sensors 38, 39 can also be arranged on the proximal face 27 of the rigid core 18, preferably in recesses (not shown) suitably positioned to receive them.

The elongation/contraction sensors 38 and the temperature sensors 39 could have their positions swapped.

The bottom bracket spindle 28, or a portion thereof, and the pedal pivot (not shown), or corresponding metallic bushes 52, 54, possibly internally threaded, or threaded inserts (masters) for making holes for such spindles/pivots, are positioned at the two ends of the core 18.

Thereafter, a "cord" of composite material 56 preferably comprising substantially unidirectional structural fiber is positioned in the recess determined by each step 29, wherein the direction of the unidirectional fiber is substantially aligned with the length direction L of the crankarm 10. The cord 56 can be formed of one or more rolled up plies of composite material, or it can comprise a braid or similar of dry unidirectional fiber, which is impregnated with polymeric material prior to the insertion in a mold, or impregnated with polymeric material during molding. A single looped cord 56 can be used, or two cords can be used, each on one side of the core 18. The cord 56 can also be partially hardened.

It should be noted that the sensors 38 are in contact with the cord 56: this can be particularly advantageous when the sensors 38 are strain gages or other elongation/contraction sensors since they turn out to be extended according to the direction of the fibers of the composite material.

Thereafter, one or more other plies 60 of composite material of any of a variety of types are wound on the structure thus prepared.

Like the cord 56, also the plies 60 may or may not be pre-impregnated, in the latter case the polymeric material being subsequently injected into the mold.

Alternatively to the cord 56 and to the plies 60 of composite material, non-ply composite material can be used, as stated above.

The structure is inserted in the mold and the composite material is consolidated, subjecting it to a suitable temperature and pressure profile. The material of the core 18 should be suitably selected so as to withstand the molding pressure and temperature, keeping its shape until hardening of the composite material, still ensuring precise positioning of the sensors 38, 39 (and of the PCB 42) inside the inner cavity 12 of the finished crankarm 10.

After the extraction from the mold, the aforementioned evacuation hole 50 can be made, for example on the proximal face 24 of the crankarm 10, and the core 18 can be suitably melted and allowed to pour out through the hole. For this purpose, the core 18 is in particular made of a low melting point metallic alloy, the melting point of which is less than 140° C.

The melting process of the alloy takes place in particular—as known for example from document EP1818252A1, incorporated herein by reference—, by placing the semi-finished product in an oil bath at a higher temperature than the melting point of the alloy. In this way, melting of the core 18 takes place without the composite material being damaged by too high temperatures.

The fixing of said one or more sensors 38, 39 to the core 18 should be such as to keep it/them in position during the assembly of the structure to be molded and during molding, but it should have a lower cohesion force than that which is established between said one or more sensors 38, 39 and the composite material, so that, when the core 18 is extracted, the sensors 38, 39 remain fixedly connected to the crankarm.

On the other hand, it is proper for the cables and/or flexible circuits 46, a length of which has to be brought out through the hole 50, not to adhere at all to the crankarm 10, at least at their free end portion.

The fixing of said PCB 42 and/or of the cables and/or flexible circuits 46 to the core 18 should similarly be such as to hold them in position during the assembly of the structure to be molded and during molding, and such that they are not dragged away by the molten core 18 coming out from the hole 50, but on the one hand the same precision of positioning of the sensors 38, 39 is not required, on the other hand it is not strictly necessary for said elements 42, 46 to adhere to the inner surface 14 of the finished crankarm 10—although it is greatly preferred so as to avoid noises and bouncing with consequent manifest problems during the use of the crankarm 10.

However, the preferred configuration of pre-assembled instrumentation body 47 advantageously also makes it easier to keep the various electrical/electronic components in position.

Following the evacuation of the material constituting the core 18, if provided for, the evacuation hole 50 can be suitably plugged, preferably in a tight manner.

The inner cavity 12 of the crankarm 10 thus formed can be finished thereafter by removing the possible metallic residuals remaining after melting through an acid wash, provided that it does not damage the sensor(s) 38, 39.

The crankarm 10 can be subjected to a further finishing cycle of the outer surface 16, for example by subjecting it to sandblasting, and the manufacture ends with the fixing of possible metallic parts provided on the crankarm 10.

In case of the right crankarm, for example, one or more chainrings are fixed, typically by gluing, to spider legs thereof. Indeed, in case of a right crankarm, the rigid core, indicated with reference numeral 19 and shown in FIGS. 4-5, is longer than the core 18 and comprises, on the side of the rotation axis X of the finished crankarm, a central hole 57 and projections 58 extending radially around the hole 57, which will define extensions of the inner cavity 12 of the right crankarm inside a corresponding number of spider legs thereof, extending radially around the metallic bush 52. The number of projections 58, respectively spider legs of the crankarm is not necessarily equal to four as shown.

The central region of the core 19 is similar to the central region of the core 18 for the manufacture of a left crankarm, and it is provided with similar conformations, indicated for the sake of convenience with the same reference numerals used to describe the core 18 for the left crankarm of FIGS. 2-3. The electrical/electronic components (PCB 42, sensors 38, 39, cables 46, pre-assembled instrumentation body 47) are also advantageously analogous to those described for the core 18, and indicated for the sake of convenience with the same reference numerals.

It should be emphasized that, by the manufacturing process illustrated above, the PCB 42 (as well as other electrical/electronic components) is therefore co-molded with the composite material of the crankarm 10, namely the crankarm 10 is molded, as a single piece, with the PCB already inserted thereinside.

The crankarm 10 therefore has, integrated in its main body, the PCB 42 and possibly the other electrical/electronic components. In particular, the crankarm has the wake unit 1000 integrated in its main body.

The PCB 42 and the wake unit 1000 are therefore advantageously enclosed in the composite material that forms the crankarm 10, and very well protected thereby against collisions, water, dirt and atmospheric agents.

The electrical/electronic components housed in the crankarm should be such as to withstand the pressure and temperature profile of the molding process—more critical in the case of composite material with thermosetting polymeric material than in the case of composite material with thermoplastic polymeric material—, as well as the acid wash if carried out, possibly when suitably protected.

The components that are not capable of withstanding such conditions, and in particular a battery power supply unit, are mechanically connected to the crankarm 10 and electrically connected to the co-molded components only after the molding of the crankarm 10, possibly inserting them into the cavity 12 through the hole 50 or other suitable holes, or fixing them to the outer surface 16 of the crankarm itself.

It is worthwhile emphasizing that the sensors 38, 39 or some of them, can also be connected after the molding of the crankarm 10, and in particular fixed to the outer surface 16 of the crankarm 10.

Alternatively, it is possible to provide a core 18 suitably designed and made to be kept seated, inside the finished crankarm 10, after molding is complete. In this case, it defines anyway a sort of inner cavity, whereby in the present description and in the attached claims, the term inner cavity 12 is meant to indicate the cavity of the composite material forming the shell or outer cladding of the crankarm 10.

The core that stays in the finished crankarm can be provided in a particularly light material, like for example high-density polypropylene or hardened composite material (which may or may not be the same as the composite material forming the shell of the crankarm 10), or in the form of a framework suitably configured for and having such a stiffness as to ensure the correct positioning of the sensors 38, 39 in the finished crankarm.

Figure 4:
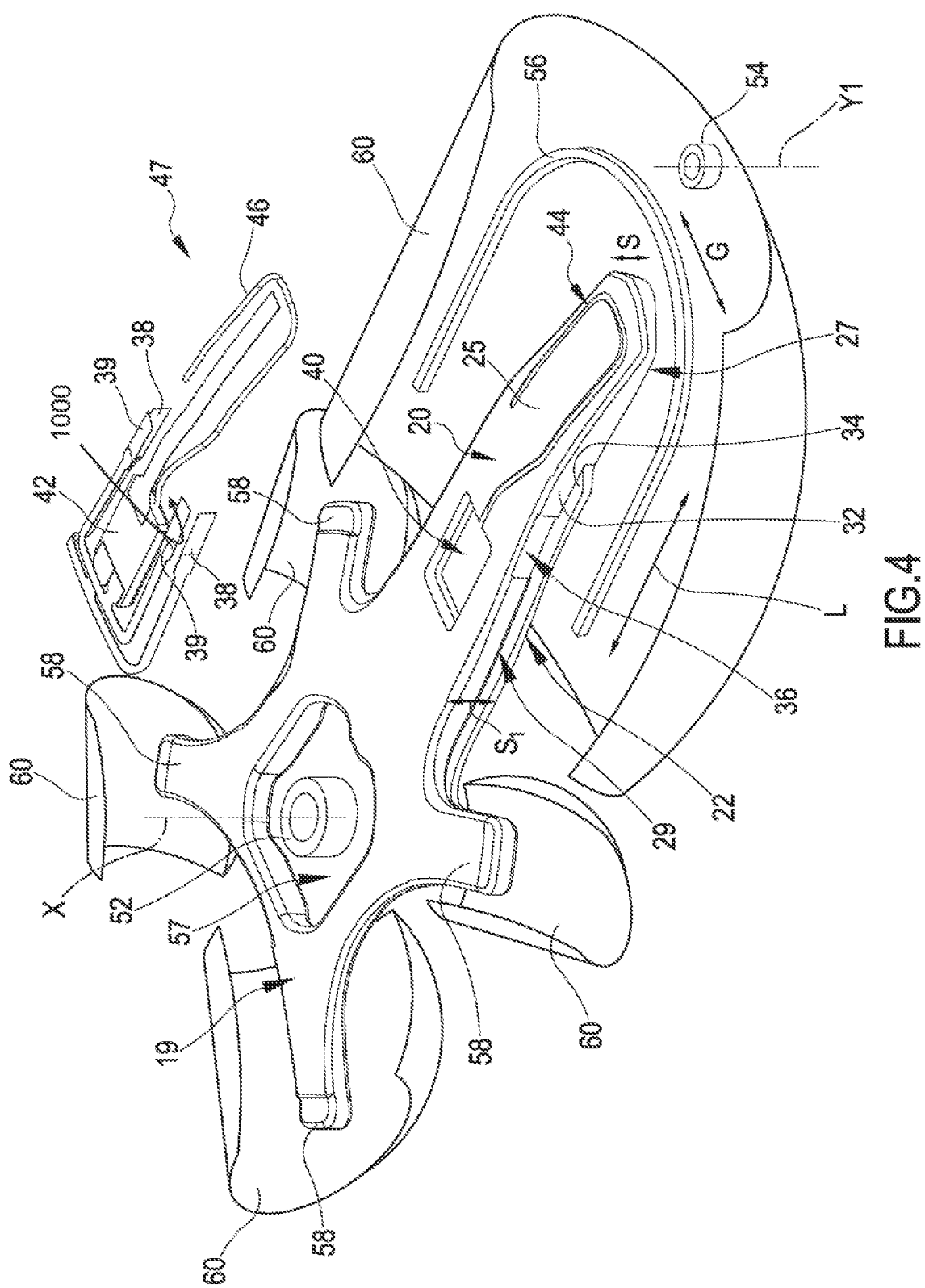
FIGS. 4-5 are views analogous to FIGS. 2-3, relative to the manufacture of a different crankarm.
Figure 5:
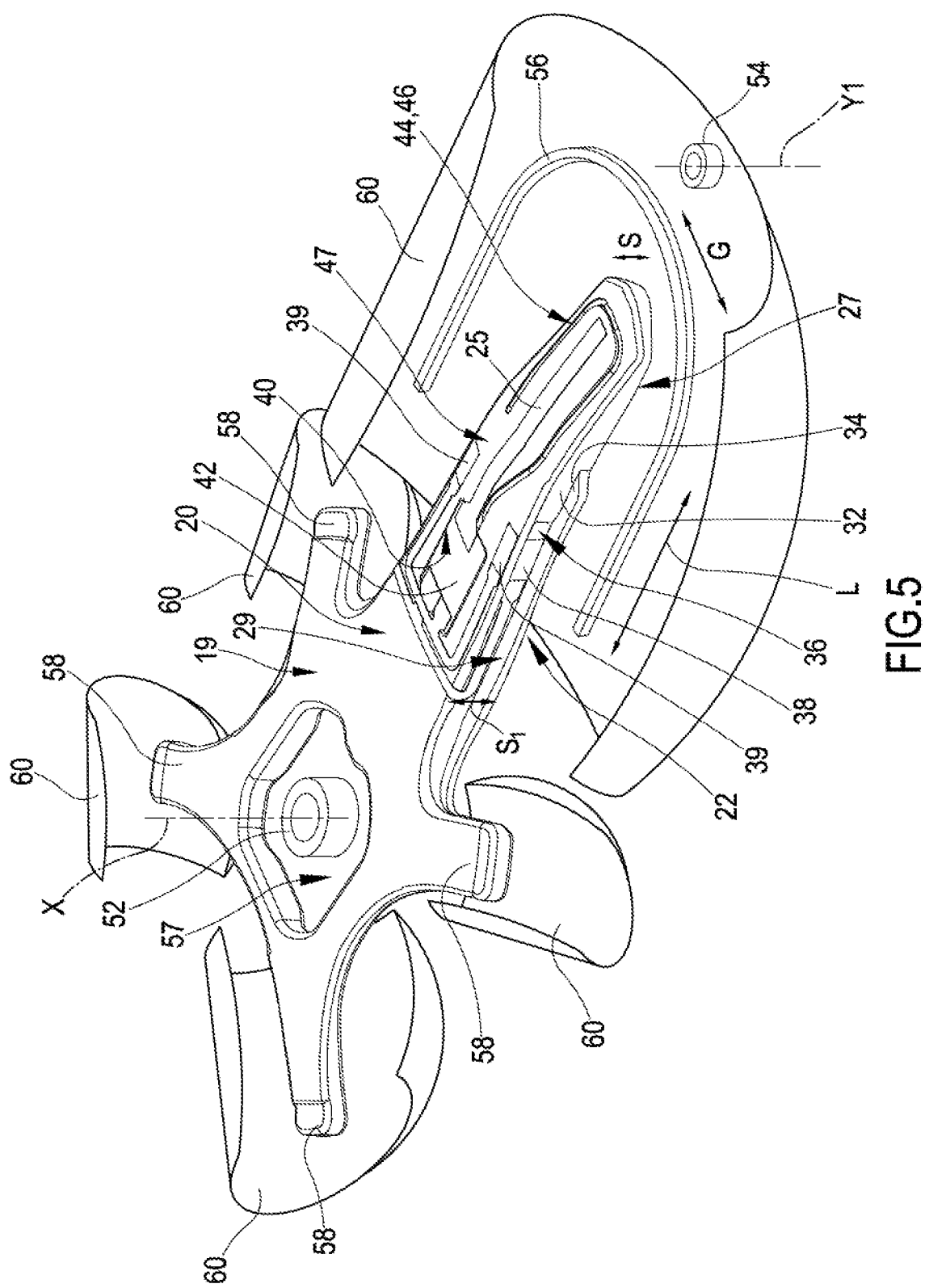

The process for manufacturing the right crankarm according to FIGS. 4-5 is substantially the same as the one described above, apart from the difference in shape and number of plies of composite material 60 that are suitably wound around the core 19, its central hole 57 and its projections 58.

Before molding, the PCB 42 is preferably provided with a protection.

The protection is for example made of a polymeric material based on a thermosetting epoxy resin, preferably a bi-component one.

The protection thus made ensures resistance to the high molding temperature and melting point of the core 18, 19, besides having a high resistance to impacts and in general to mechanical stresses, in particular to the high molding pressure.

The pressure and/or temperature to which the electrical/electronic components are subjected are advantageously lowered to non-critical levels by the protection.

Furthermore, the protection ensures a suitable electrical insulation, which can be useful in the case of water infiltration in the cavity 12.

The protection advantageously also ensures a suitable impermeability and resistance to chemical agents, in particular to the washing acid bath of the manufacturing process.

In order to cover the PCB 42 with the epoxy resin protection, the core 18, 19 itself is advantageously—but not necessarily—used. The PCB 42 is arranged in the recess 40 of the core 18, 19 with the face carrying the electrical/electronic components oriented towards the core 18, 19, namely towards the recess 40. The epoxy resin in fluid state is then injected into the recess 40, beneath the PCB 42, and fills the empty spaces between the electrical/electronic components and the bottom of the recess 40. The resin can also be inserted in the recess before the insertion of the PCB 42. The resin is then partially hardened or allowed to harden, thereby forming a stable protection.

Alternatively to epoxy resin, it is possible to use other materials, mostly polymeric, which have analogous or similar properties, so as to ensure an adequate protection for the PCB 42, like for example methacrylate, polyurethane, an acrylic material.

Some of the electrical/electronic components of the PCB 42 can be further protected against the mechanical stresses involved during molding by adding suitable dampening elements (not shown) between them and the epoxy resin.

The dampening element has a much lower stiffness than that of the protection. In this way, when a mechanical load is applied outside of the protection—in particular that caused by the high molding pressure—, the dampening element dissipates the resulting pressure at the underlying electrical/electronic component, discharging the load onto the protection portion surrounding the electrical/electronic component.

The electrical/electronic component to which the dampening element is applied is for example an accelerometer, which is the component that is most fragile or sensitive to the mechanical loads when its operation is based on mechanical actuators comprising moving microarmatures; the accelerometer is therefore the component that most easily risks being damaged during molding due to the high pressures involved, which can cause small strain onto the PCB 42 that result in the accelerometer microarmatures being damaged.

For the dampening element, a silicone polymer is used. Alternatively, other soft polymeric materials can be used, for example polyurethane.

In case of a solid crankarm, it is furthermore possible to use a recess in a suitable support to form the protection outside of the mold; the protected PCB 42 is then covered by layers of composite material before insertion in the mold, or it is inserted in the mold cavity and integrated in non-layered composite material. Finally, the PCB 42 is co-molded with the possible other components and with the composite material forming the crankarm 10.

Alternatively or additionally, the electrically insulating protection can comprise a layer, in particular at least one ply, of composite material comprising insulating fiber, preferably glass fiber, in particular when said at least one face carries tracks and/or electrical connection pads.

Alternatively to the glass fiber composite material it is possible to use other electrically insulating materials, having analogous or similar properties, like for example thermoplastic fibers, for example nylon-based fibers or fibers of the Dyneema® type, basalt-based mineral fibers, aramid fibers or Zylon®.

Preferably, the composite material comprising insulating fiber has a polymeric matrix equal to or at least compatible with the polymeric matrix of the composite material of the bicycle component, in terms of polymerization or hardening pressure and temperature profile.

Alternatively or additionally to the aforementioned protections, when said at least one first face of said printed circuit board carries at least one electric/electronic component, the step of providing with protection can comprise covering said at least one first face with a cover or a framework, containing said at least one electric/electronic component.

The crankarm cross-section can be hollow, respectively solid, only in a region containing the printed circuit board, and solid, respectively hollow, in other regions.

Alternatively, the crankarm can be made of metallic material and the components of the torque or power meter or other electric/electronic system, as well as the wake unit 1000, can be fixed to the outside thereof in a suitable casing, or can be housed at cavities or recesses suitably made on the crankarm, possibly then tightly closed by a cover or by a sealing material.

Figure 6:
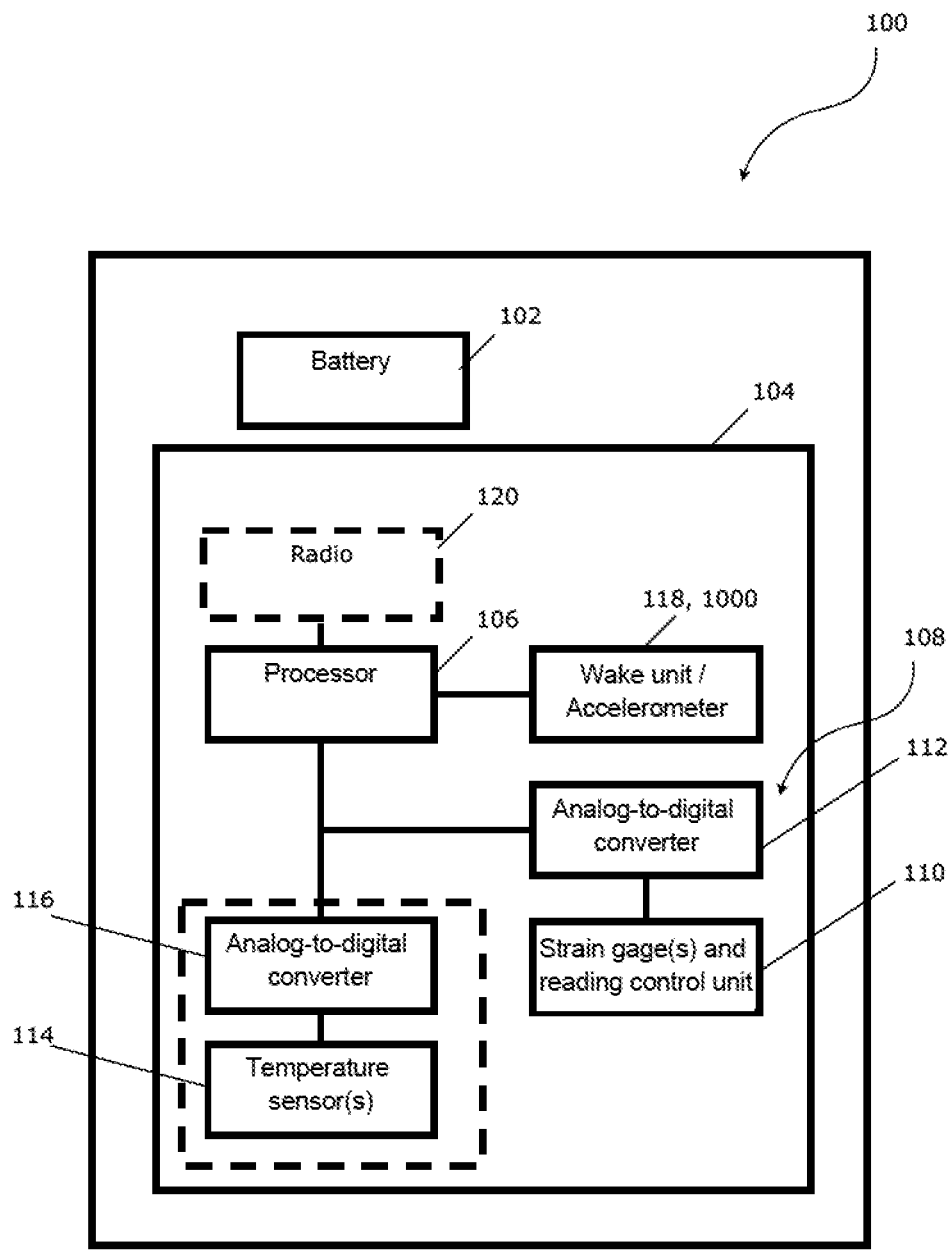
FIG. 6 is a block diagram of an electric/electronic system provided with wake unit incorporated in a bicycle crankarm according to an embodiment of the present invention.

FIG. 6 illustrates a block diagram of an electric/electronic system provided with wake unit 1000, which in the case shown is a power meter 100, incorporated in a bicycle crankarm according to a first embodiment of the present invention.

The power meter 100 comprises a battery power unit 102 and electric/electronic components 104 powered thereby.

The electric/electronic components 104 comprise a processor 106.

The electric/electronic components 104 comprise a stress/strain detector 108 comprising in particular one or more strain gages and related reading control unit, globally indicated with reference numeral 110, as well as an analog-to-digital converter 112.

The strain gages 110 are preferably electrical resistance strain gages.

The strain gages 110 can be attached to an outer surface of the crankarm, irrespective of whether the crankarm is solid or hollow.

Alternatively, the crankarm can comprise at least one cavity (and a shell of composite material comprising structural fiber incorporated in a polymeric matrix extending around said cavity) and the strain gages 110 can be attached to an inner surface of the cavity (inner surface of the shell).

Alternatively, the crankarm made of composite material can comprise a core (and a shell made of composite material comprising structural fiber incorporated in a polymeric matrix extending around said core), the strain gages 110 being arranged between the core and the composite material (between the core and the shell).

Alternatively to the provision of a core or of a cavity, both faces of said strain gages 110 can be in contact with the composite material. In this case, the section of the crankarm is solid, at least in the region containing said strain gages 110.

In a preferred embodiment, the strain gages 110 are arranged in a hollow crankarm 10 made of composite material like the sensors 38 of FIGS. 2-5.

The stress/strain detector 108 optionally also comprises one or more temperature sensors and related reading control unit, globally indicated with reference numeral 114, as well as a second analog-to-digital converter 116.

The processor 106 derives a measurement of the pedaling torque applied by the cyclist on the crankarm based on the force obtained from the output from the stress/strain detector 108 (in particular from the analog-to-digital converter 112) and based on the known length of the crankarm.

The force measurement can be suitably corrected based on the temperature measurement provided by the stress/strain detector 108 (in particular by the second analog-to-digital converter 116), so as to take the apparent deformation of the strain gages caused by temperature changes into account.

The details of the stress/strain detector 108 are not provided because its specific construction lies outside of the present invention and is in any case within the capabilities of those skilled in the art.

Moreover, hereinafter for the sake of brevity the temperature sensors and related reading control unit 114 and the second analog-to-digital converter 116 will be neglected, it being understood that they are preferably managed as the strain gages and related reading control unit 110 and analog-to-digital converter 112 are managed.

The electric/electronic components 104 comprise an accelerometer 118.

The operation of the accelerometer 118 can be based on different physical principles: it can for example exploit the piezoelectric effect, the piezo-resistive effect, the capacitive effect, or it can measure eddy currents. The accelerometer 118 can be very small in size, of the order of a micrometer in the case of accelerometers of the MEMS type or even of a nanometer in the case of accelerometers of the NEMS type.

The processor 106 is configured to analyze the output of the accelerometer 118 over time through suitable algorithms, per se known and that are not therefore described herein in detail, so that the assembly of processor 106 and accelerometer 118 implements a sensor of the rotation speed of the crankarm or pedaling cadence. Briefly, the algorithm for analyzing the output of the accelerometer 118 searches for a specific sinusoidal waveform by filtering the output signal of the accelerometer, and calculates the period thereof, which corresponds to a rotation of the crankarm. The rotation cadence is obtained from the number of rotations per unit time.

The processor 106 is furthermore configured to combine the pedaling torque measurement and the cadence measurement, and output a pedaling power measurement.

Figure 7:
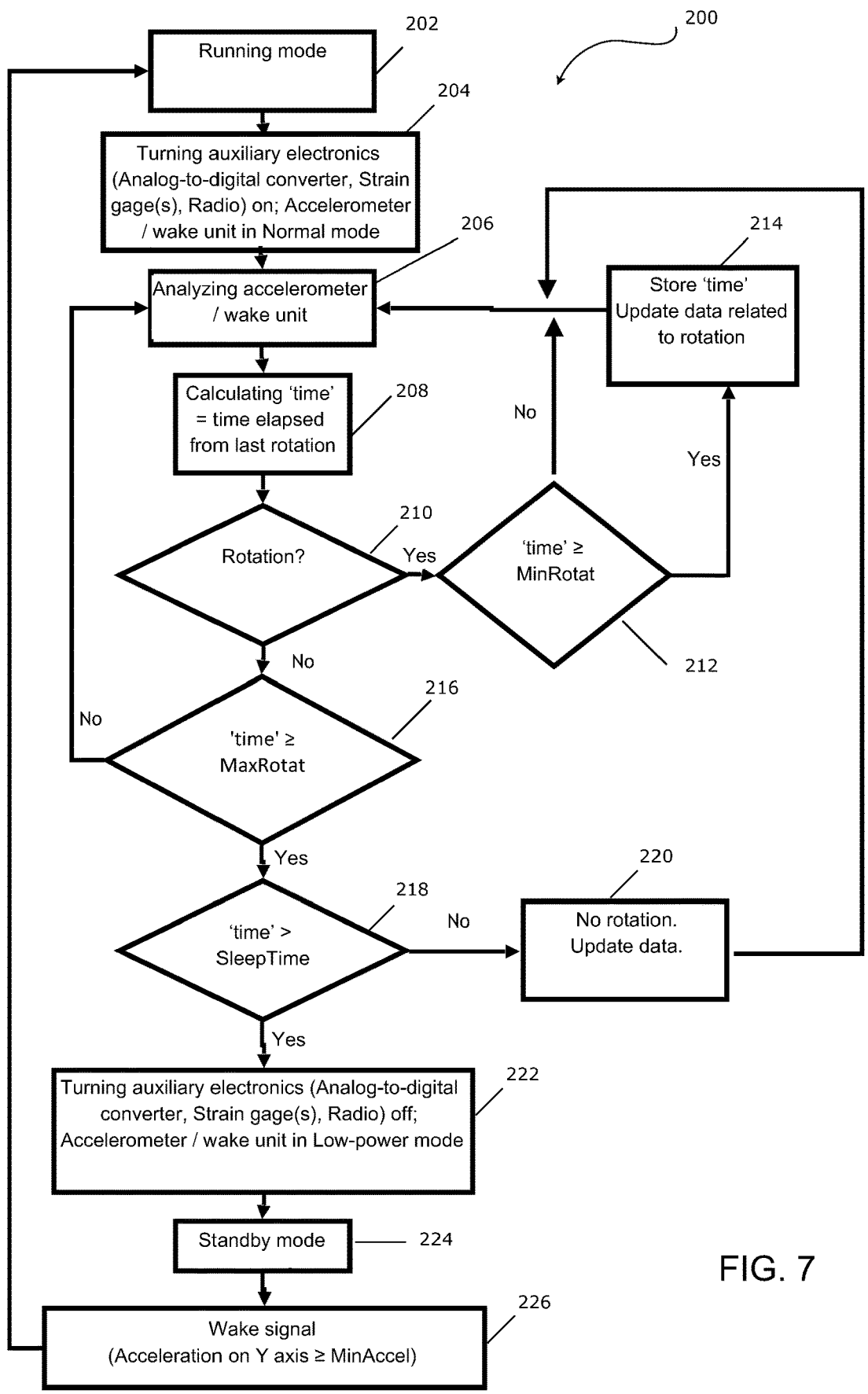
FIG. 7 shows a flow chart relative to the operation of the electric/electronic system of FIG. 6, according to a first embodiment thereof.
Figure 8:
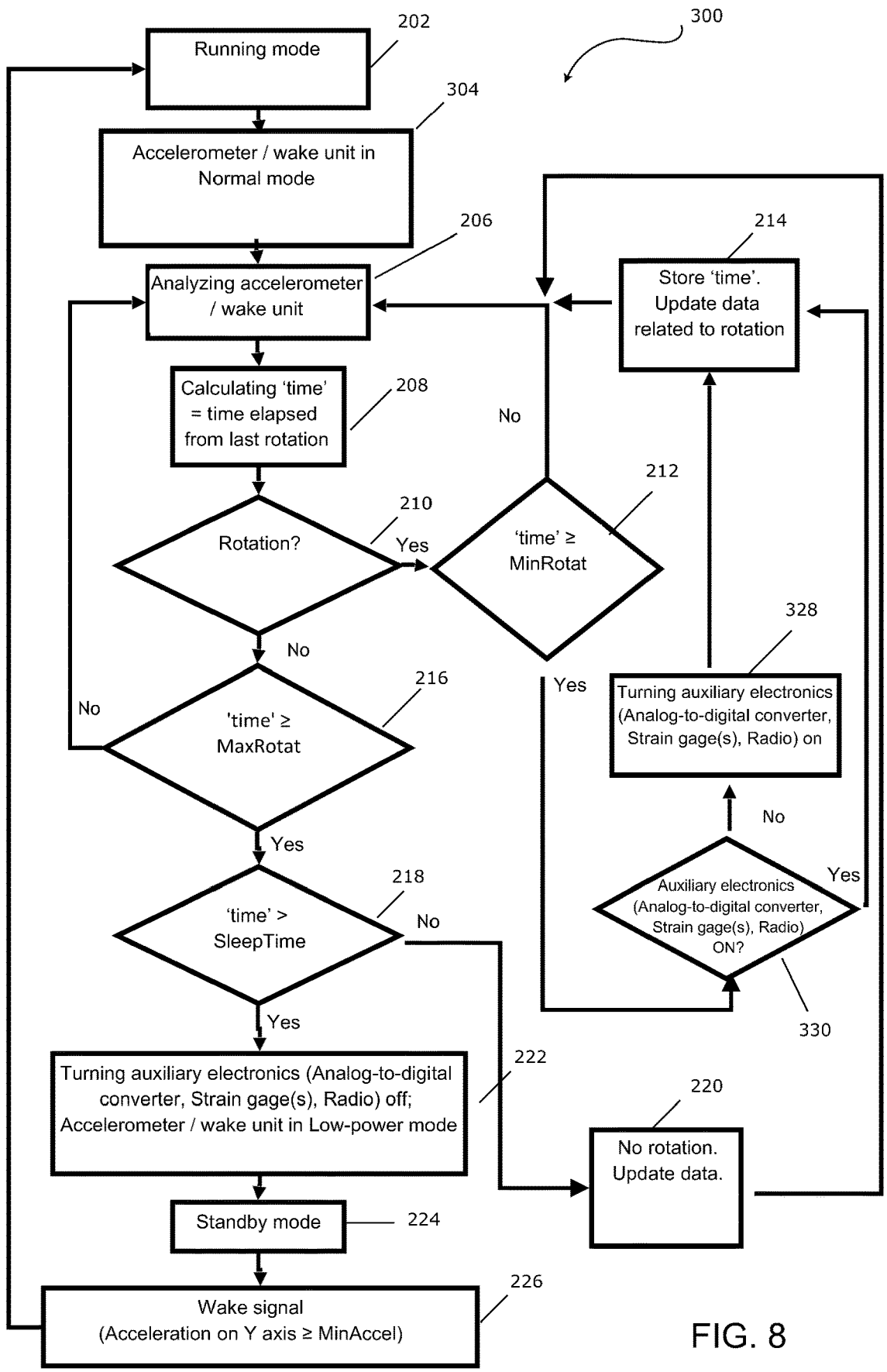
FIG. 8 shows a flow chart relative to the operation of the electric/electronic system of FIG. 6, according to a second embodiment thereof.
Figure 9:
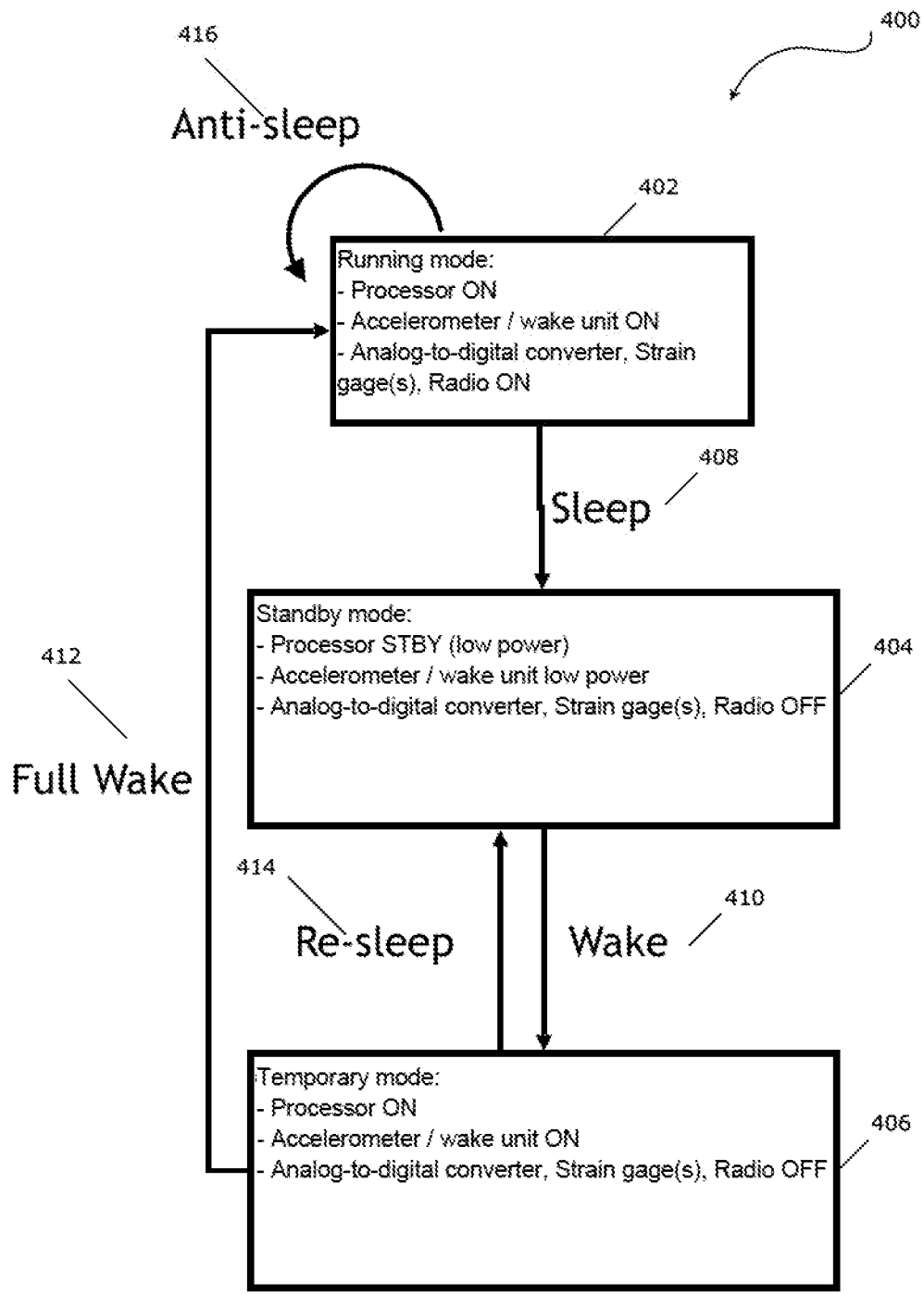
FIG. 9 shows a state diagram relative to the electric/electronic system of FIG. 6 when actuated with the method of FIG. 8.

The accelerometer 118, in this embodiment, in a particularly advantageous manner also takes the place of the wake unit 1000, as will be better understood from the following description of FIGS. 7-9.

The electric/electronic components 104 comprise a communication device 120, in particular a radio 120, for communicating the torque measurement and/or the power measurement (and possibly the cadence measurement) to a processor external to the crankarm. The communication device can furthermore be used for any other communication between the crankarm and the outside, for example for the configuration and updating of the firmware and software of the processor 106.

FIG. 7 shows a flow chart 200 relative to the operation of the power meter 100 provided with wake unit 1000, according to a first embodiment. The flow chart in particular represents a program executed in the processor 106.

In a block 202, processor 106 enters a wake mode. The first execution of block 202 can for example be caused by the insertion of the battery power unit 102 in the crankarm, or it can be caused by turning on an on/off switch, not shown.

Thereafter, in a block 204 the processor 106 takes care of turning on the auxiliary electronics: in particular the analog-to-digital converters 112, the strain gages and related reading control unit 110, and the radio 120 are turned on.

Furthermore, in block 204 the processor 106 takes care of placing the accelerometer 118/wake unit 1000 in normal running mode. Such components therefore enter into a normal running mode in which they consume electrical energy coming from the battery 102, and the power detector 100 is ready and completely operational.

The accelerometer 118/wake unit 1000, when it is in normal running mode, has a comparatively high precision and a comparatively high sampling frequency, for example 12 bit, 400 Hz.

Thereafter, in a block 206 the processor 106 takes care of analyzing the output of the accelerometer 118/wake unit 1000 to derive, in a per se known manner as stated above, the rotation cadence of the crankarm, to be used for the purpose of calculating the pedaling power. According to the invention, the output of the accelerometer 118/wake unit 1000 is further analyzed for the purpose of identifying whether there is an acceleration, and in particular a vibration of the crankarm, and whether there is a rotation of the crankarm, so as to implement a presumed use detector and an actual use detector of the wake unit 1000 as will be discussed hereinafter.

In a block 208, the processor 106 calculates the time elapsed from the last rotation of the crankarm detected in the step of analyzing the output of the accelerometer 118 of block 206, 'time'.

In a block 210, the processor 106 checks whether the output of the accelerometer 118/wake unit 1000 is indicative of another rotation of the crankarm after said last rotation detected, namely whether the form of the output of the accelerometer 118/wake unit 1000 has made a period of a sinusoidal wave.

In the affirmative case, namely if the processor detects a new rotation, in a block 212 the processor 106 checks whether the time 'time' is greater than or equal to a minimum threshold value MinRotat. If the check of block 212 is negative the execution returns to block 206 of analyzing the output of the accelerometer, without there being any updating of the cadence data used by the power meter 100. In such check, a time 'time' that is too short, namely a period of a sinusoidal wave that is too short, is considered to correspond to an oscillation of the crankarm about a certain angular position, but not to an actual rotation of the crankarm. The signal of the accelerometer 118/wake unit 1000 is therefore, in this case, indicative of a presumed use of the bicycle and in particular of the crankarm, but not of an actual use. The accelerometer 118/wake unit 1000 therefore, in this context, performs the particular role of presumed use detector of the wake unit 1000. The minimum threshold value MinRotat can for example be 250 msec.

If, on the other hand, the check of block 212 is positive, so that the sinusoidal wave period is realistically indicative of a rotation of the crankarm, in a block 214 the processor stores the time 'time' and takes care of updating the data relative to the crankarm rotation, returning then to block 206 of analyzing the output of the accelerometer 118/wake unit 1000; in other words, in the subsequent execution of block 208, the time 'time' will be calculated as the time elapsed from this updated value of the time 'time'. The signal of the accelerometer 118/wake unit 1000 is therefore, in this case, indicative of an actual use of the bicycle, and in particular of the rotation of the crankarm during pedaling. The accelerometer 118/wake unit 1000 therefore, in this context, plays the particular role of actual use detector of the wake unit 1000. Furthermore, the accelerometer 118 fully plays its role of cadence detector of the power meter 100.

The data relative to the rotation updated in block 214 can be directly sent to an external processor, or temporarily stored by the processor 106 and sent later, possibly after having obtained average, minimum and maximum values thereof.

If the check of block 210 is negative, namely if the output of the accelerometer 118/wake unit 1000 is not indicative of any new rotation of the crankarm, the processor checks in a block 216 whether the time 'time' elapsed since the last detected rotation is greater than or equal to a threshold value given by a maximum rotation time MaxRotat, corresponding to a minimum cadence.

In case of negative check in block 216, the execution returns to block 206 of analyzing the output of the accelerometer 118/wake unit 1000, and the processor 106 simply waits for a crankarm rotation event. During normal use of the bicycle, and when the cyclist is actually pedaling, the processor 106 waits for the rotation to be completed, and a cyclic sequence of steps of blocks 206, 208, 210, 216 may last for example 1 second, corresponding to a cadence of 60 rpm.

In case of positive check in block 216, the processor checks in a block 218 whether the time 'time' elapsed since the last detected rotation is less than or equal to another threshold value, given by a sleep time SleepTime.

As long as the time 'time' is greater than the maximum rotation time MaxRotat, corresponding to a minimum cadence, but shorter than the sleep time SleepTime (output No from block 218), the processor 106, in a block 220, determines that the crankarm is temporarily stationary, and updates the power data accordingly. In this manner, the processor 106 takes into account the fact that also during normal use of the bicycle there are moments in which the crankarm is not set into rotation: for example at traffic lights, riding downhill, decelerating, etc. The value of the maximum rotation time MaxRotat is for example 3 seconds, corresponding to a cadence of 20 rpm.

If, on the other hand, in block 218 the processor 106 checks that the time 'time' elapsed since the last detected rotation is greater than the sleep time SleepTime, the processor 106 establishes that the cyclist has stopped using the bicycle, or in any case is no longer pedaling. A suitable value for the sleep time SleepTime is for example 2-5 minutes.

In this case, in a block 222 the processor 106 takes care of turning off the auxiliary electronics, comprising the strain gages 110, the analog-to-digital converter 112, and the radio 120. The processor 106 furthermore takes care of placing the accelerometer 118/wake unit 1000 in low-power running mode. In such a mode, the accelerometer 118/wake unit 1000 has a comparatively low precision and a comparatively low sampling frequency, for example 8 bit, 20 Hz. This low-power running mode is totally suitable for playing the role of wake unit 1000, while it is not suitable for the role of cadence meter of the power meter 100.

Thereafter, in a block 224 the processor 106 enters into standby mode.

Consequently, the electrical consumption of the power meter 100 reduces to a minimum, and the charge of the battery 102 is advantageously preserved.

In a block 226, the processor 106 receives a wake signal and returns to the running mode of block 202.

The wake signal is advantageously provided by an interrupt generated by the accelerometer 118/wake unit 1000 when it detects an acceleration, along one of its axes, equal to or greater than a threshold value or minimum acceleration MinAccel. Said axis is preferably an axis perpendicular to the longitudinal axis of the crankarm, extending in a tangent direction with respect to the rotation axis of the crankarm (width direction G indicated in FIG. 1). It should also be noted that in the low-power mode, the accelerometer 118/wake unit 1000 is capable of providing said interrupt, acting as detector of presumed use of the bicycle.

It is worthwhile emphasizing that in the case of a biaxial or triaxial accelerometer, it is possible to use an axis (the one extending according to the width direction G of the crankarm 10 indicated in FIG. 1) to detect the rotation cadence, and therefore to mainly carry out the role of cadence meter of the power meter 100, and instead use another axis (in particular the one extending according to the longitudinal direction L of the crankarm 10 indicated in FIG. 1, but also the one extending according to the thickness direction S) to detect the vibration and therefore to mainly carry out the role of wake unit 1000. Both roles can however be carried out using the same axis (the one extending according to the width direction G of the crankarm 10 indicated in FIG. 1).

The wake signal detected in block 226 could be more complex than the one shown, and comprise in particular not only the detection of an acceleration greater than the minimum threshold value MinAccel, but also the detection of a complete rotation of the crankarm, so as to prevent vibrations, caused for example during the transportation of the bicycle or by a vehicle passing by the stationary bicycle, from possibly leading to needless wake up of the power detector 100.

FIG. 8 shows a flow chart 300 relative to the operation of the power meter 100 provided with wake unit 1000, according to a second embodiment. The flow chart 300 also represents in particular a program executed in the processor 106, and it is only described in how it differs from the flow chart 200 of FIG. 7.

Block 204 is replaced by a block 304 in which the processor 106 only takes care of placing the accelerometer 118/wake unit 1000 in normal running mode. It should be emphasized that this normal running mode is totally suitable for playing both the role of wake unit 1000—as presumed use detector and actual use detector and in particular avoiding the passage into standby mode—, and the role of cadence meter of the power meter 100.

The processor 106 takes care of turning the auxiliary electronics on (in particular the analog-to-digital converter 112, the strain gages and related reading control unit 110, and the radio 120 are turned on) only in a block 328 carried out when in block 212 the processor 106 checks that the time 'time' is greater than or equal to the minimum threshold value MinRotat, after in block 210 it has detected a new rotation. Block 328 of turning the auxiliary electronics on is carried out before block 214 in which the processor 106 stores the time 'time' and takes care of updating the data relative to the rotation of the crankarm.

Block 328 is not carried out if the auxiliary electronics is already turned on, as checked in a block 330 arranged between block 212 and block 328.

FIG. 9 shows a state diagram relative to the power meter 100 when operated with the method of FIG. 8.

In a running mode 402 of the power detector 100, the processor 106 is in running mode, the accelerometer 118/wake unit 1000 is in normal running mode, and the auxiliary electronics (analog-to-digital converter 112, strain gages and related reading control unit 110, radio 120) is turned on. The energy consumption is the maximum. In this mode, the power detector 100 collects the torque and cadence data (the accelerometer 118/wake unit 1000 also plays the role of cadence meter of power meter 100) and possibly transmits them to an external processor. In this mode, furthermore, the power detector 100 preferably ignores the torque and cadence data if the cadence is outside of a predetermined cadence range corresponding to a rotation time delimited by the extremes MinRotat and MaxRotat.

In a standby mode 404 of the power detector 100, the processor 106 is in standby or low-power mode, the accelerometer 118/wake unit 1000 is in low-power running mode, wherein it plays the role of wake unit 1000 but not that of cadence detector of the power detector 100, and the auxiliary electronics (analog-to-digital converter 112, strain gages and related reading control unit 110, radio 120) is turned off. The energy consumption is the minimum.

In a temporary mode 406 of the power detector 100, the processor 106 is in running mode, the accelerometer 118/wake unit 1000 is in normal running mode (the accelerometer 118/wake unit 1000 also plays the role of cadence meter of the power meter 100), and the auxiliary electronics (analog-to-digital converter 112, strain gages and related reading control unit 110, radio 120) is turned off. The energy consumption is still fairly low.

The event or signal that determines the transition from the state of running mode 402 to the state of standby mode 404 is indicated as Sleep signal and corresponds to the passing of the sleep time SleepTime without the detection of any rotation by the processor 106 through the accelerometer 118/wake unit 1000.

The event or signal that determines the transition from the state of standby mode 404 to the temporary state 406 is indicated as wake signal Wake and corresponds to the interrupt signal generated by the accelerometer 118/wake unit 1000, in particular when it acts as presumed use detector, detecting an acceleration or a vibration of the crankarm.

The event or signal that determines the transition from the state of temporary mode 406 to the state of running mode 402 is indicated as full wake signal Full Wake, and corresponds to the detection of a suitable pedaling cadence, provided by the accelerometer 118/wake unit 1000 in its role of actual use detector. It should be emphasized that the temporary mode allows the vibrations (provided by the accelerometer 118/wake unit 1000 in its role of presumed use detector) to be ignored, avoiding entering into full running mode 402 of the power detector 100.

It is therefore also possible for the system to go back from the state of temporary mode 406 to the state of standby mode 404, i.e. without turning the auxiliary electronics on; the relative transition being indicated as Re-Sleep 414 and corresponding to the detection of the presumed use signal, but not of the actual use signal by the accelerometer 118/wake unit 1000. This situation occurs when the bicycle is displaced/moved without there being rotation of the crankarm, for example when it is transported on a bicycle carrier of a car, and is subjected to stresses by the wind.

For the sake of completeness, permanence in running mode 402 is also indicated, as Anti-sleep 416, corresponding to continued pedaling.

The state diagram relative to the power meter 100 when operated with the method of FIG. 7 is a simplification wherein the temporary mode 406 and the full wake signal Full Wake 412 are absent, the wake event or signal Wake directly determining the transition from the state of standby mode 404 to the state of running mode 402, as will be clear to those skilled in the art upon reading the present description.

From the above it can be understood that in the embodiment of torque or power meter, the accelerometer 118 acts as presumed use detector.

Figure 10:
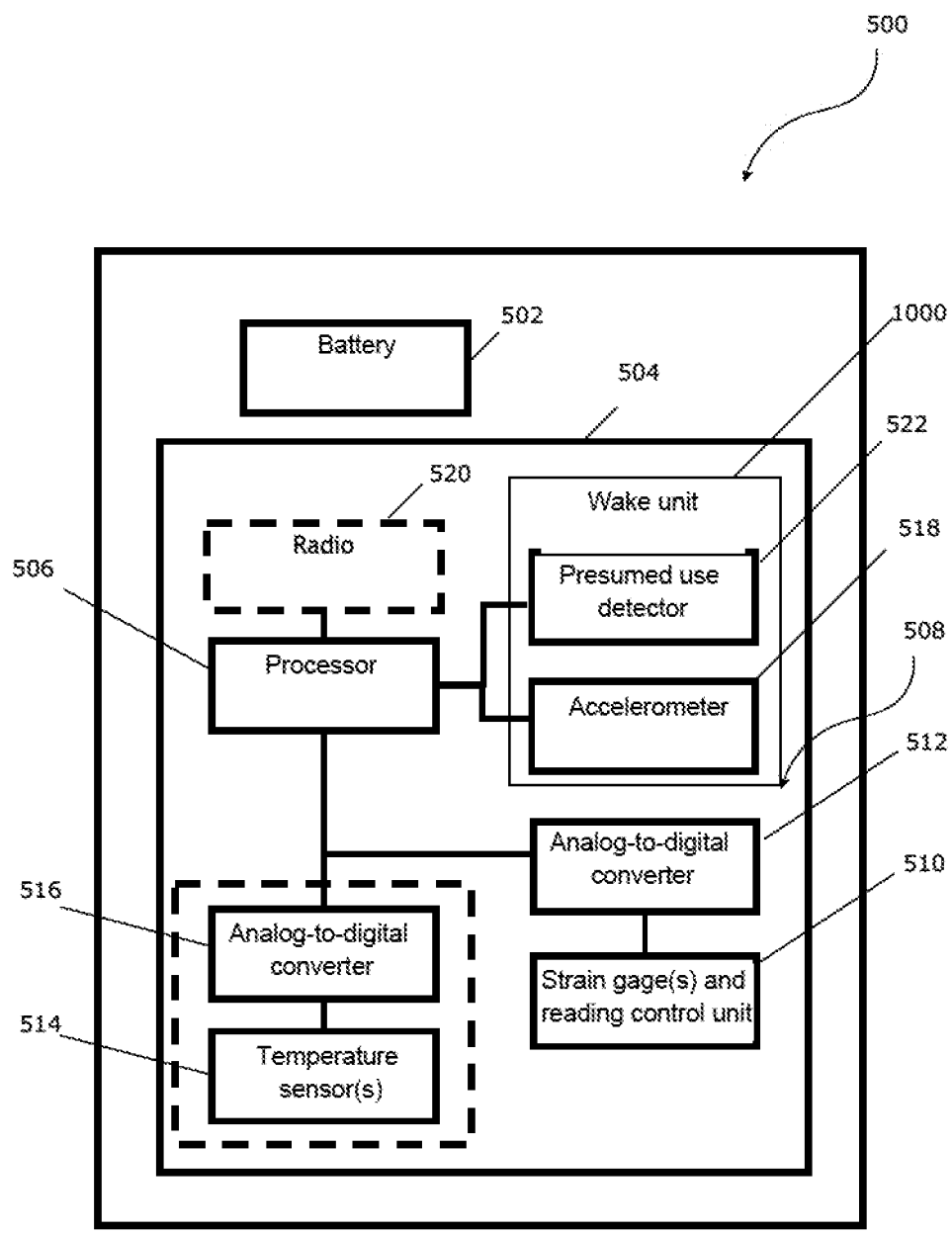
FIG. 10 is a block diagram of an electric/electronic system provided with wake unit incorporated in a bicycle crankarm according to a second embodiment of the present invention.

FIG. 10 illustrates a block diagram of an electric/electronic system provided with wake unit 1000, which in the case shown is a power meter 500, incorporated in a bicycle crankarm according to a second embodiment of the present invention.

The power meter 500 differs from the power meter 100 of FIG. 6 in that it comprises a presumed use detector 522 distinct from the accelerometer, herein indicated with reference numeral 518. The other components of the power meter 500 are indicated with the same reference numerals increased by 300, so that a battery power unit 502, electric/electronic components 504, a processor 506, a stress/strain detector 508, one or more strain gages and related reading control unit, globally indicated with reference numeral 510, an analog-to-digital converter 512, one or more temperature sensors and related reading control unit, globally indicated with reference numeral 514, a second analog-to-digital converter 516, the aforementioned accelerometer 518 and a communication device 520, in particular a radio 520, are indicated.

In this embodiment, since a presumed use detector 522 completely incorporated in the crankarm and distinct from the accelerometer 228 is provided for, no low-power mode of the accelerometer is used, which could lack such a mode.

The presumed use detector 522 can be implemented through a vibration sensor alternative to an accelerometer. A vibration sensor alternative to an accelerometer is a so-called ball-in-cage switch, namely a switch wherein the movement of a ball inside a conductive cage makes the ball contact the cage and completes a circuit, closing the switch.

Using a vibration sensor has the advantage of generating a wake event as soon as the bicycle is used by the cyclist, but it has the drawback of causing "false positives". As highlighted above, such "false positives" can be overcome by additionally detecting, before passing to running mode, a full rotation of the crankarm through the accelerometer 518, which therefore acts as actual use detector.

Therefore, the wake unit 1000 is in this specific case formed from the assembly of the presumed use detector 522 and of the accelerometer 118 as actual use detector.

The presumed use detector 522 does not necessarily need to be a vibration sensor. Alternatives to a vibration sensor are as follows:
 a tilt sensor,
 a self-contained magnetic field sensor, namely lacking any external components, such as a magnetometer, configured to measure the earth's magnetic field and perceive the perturbations thereof as a consequence for example of the change of position of the crankarm with respect to an element of the bicycle, for example the derailleur;
 a barometer that measures the pressure of the wind/air on the crankarm, in turn indicative of the state of movement or stationary state of the crankarm;
 a position and/or rotation sensor, for example a gyroscope;
 a force and/or pressure and/or mechanical stress sensor, for example a sensor that perceives the pressing of the cyclist on the crankarm; in particular such a sensor can advantageously use the same strain gages 510 as the power meter 500, however connected to a potentiometer that has lower consumption than the analog-to-digital converter 512.

There can be more than one sensor of each type indicated above.

Figure 14:
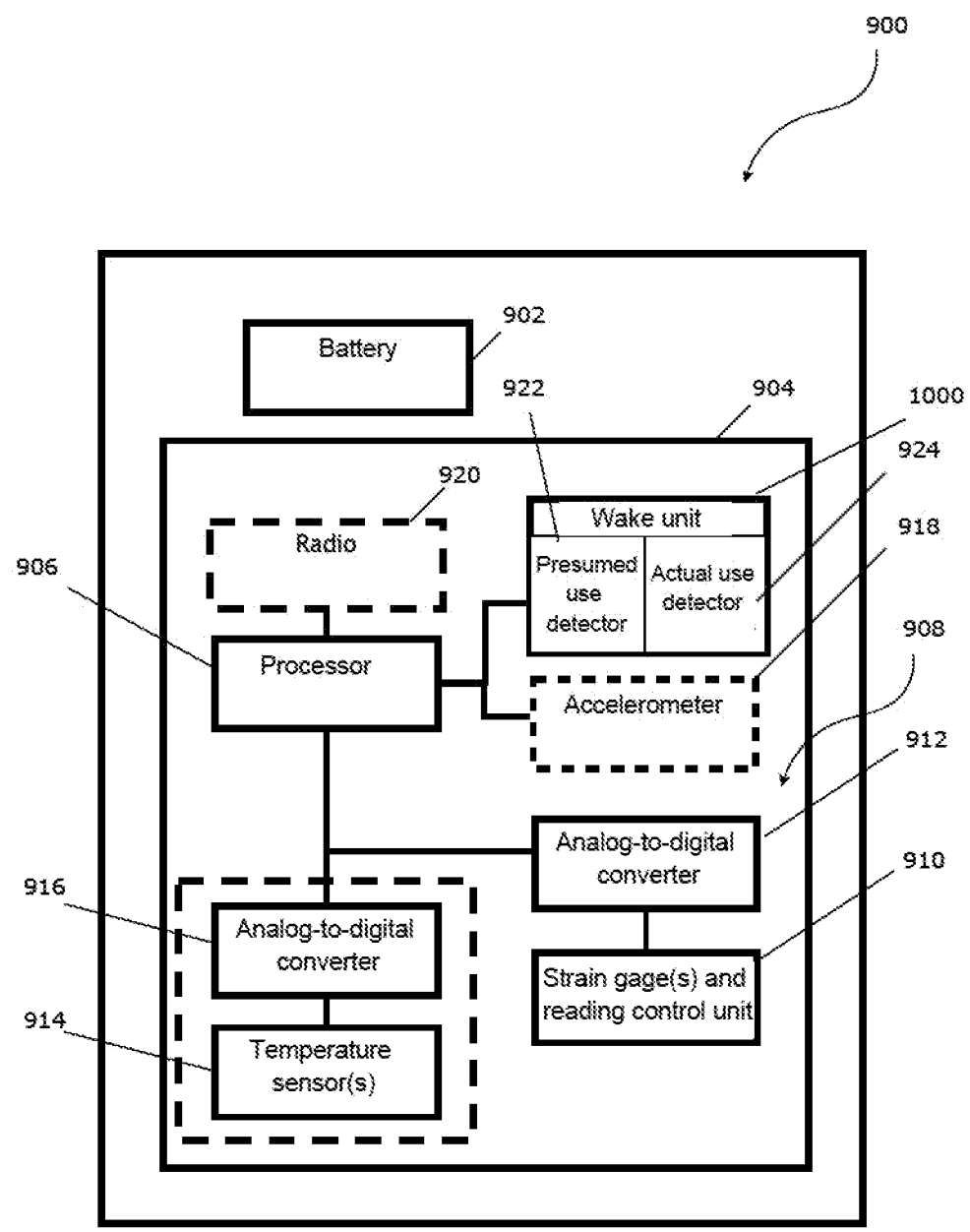
FIG. 14 is a block diagram of an electric/electronic system provided with wake unit incorporated in a bicycle crankarm according to a third embodiment of the present invention.

It is emphasised as of now that at least some of the detectors indicated above are also useful as actual use detectors of the crankarm, in particular the magnetic field sensor, the position sensor and the force and/or pressure and/or mechanical stress sensor; the discussion will come back to this in relation with FIG. 14.

Figure 11:
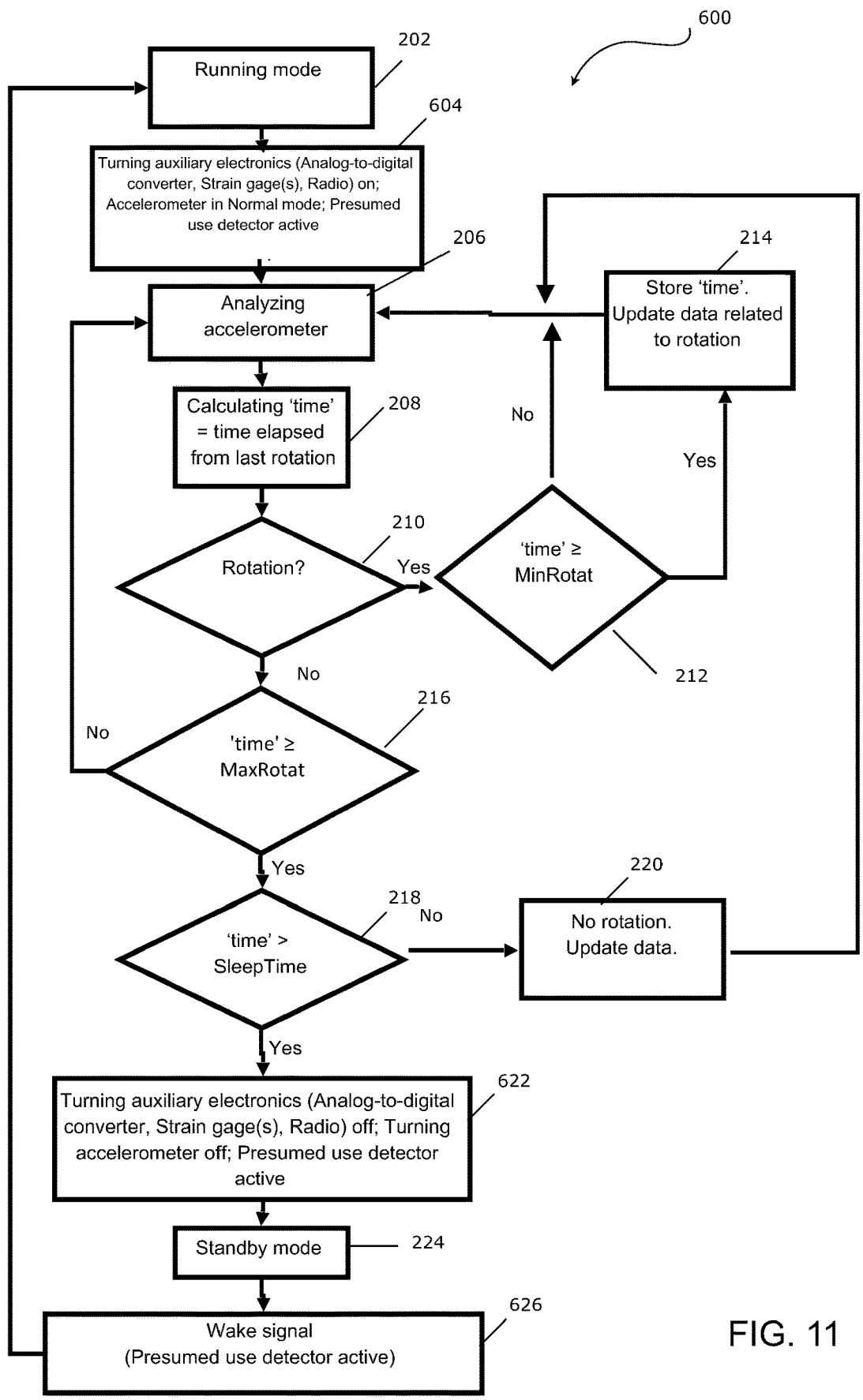
FIG. 11 shows a flow chart relative to the operation of the electric/electronic system of FIG. 10, according to a first embodiment thereof.

FIG. 11 shows a flow chart 600 relative to the operation of the power meter 500 provided with wake unit 1000, according to a respective first embodiment. The flow chart also represents a program executed in the processor 506, and it is only described in how it differs from the flow chart 200 of FIG. 7.

Block 204 is replaced by a block 604 in which the processor 506 besides taking care of turning the auxiliary electronics on (in particular the analog-to-digital converters 512, the strain gages and related reading control unit 510, and the radio 520 are turned on) and placing the accelerometer 518 in normal running mode, also takes care of turning the presumed use detector 522 on (like the first time the power detector 500 is turned on through a switch or through insertion of the battery power unit 502) or keeping it turned on.

Block 222 is replaced by a block 622 in which the processor 106 this time takes care of turning the accelerometer 118 off, as well as turning off the auxiliary electronics (strain gages 510, analog-to-digital converter 512, radio 520); the processor 106 also takes care of keeping the presumed use detector 522 turned on.

After the processor 506 also enters into standby in block 224, only the presumed use detector 522 thus remains turned on, and consequently the electrical consumption of the power meter 500 reduces to a minimum, and the charge of the battery 1502 is advantageously preserved.

Block 226 is replaced by a block 626 in which the processor 506 receives a wake signal—to return thereupon to the running mode of block 202—provided by the presumed use detector 522 of the wake unit 1000.

Also in this case, the wake signal detected in block 626 could be more complex and comprise in particular not only the detection of the signal provided by the presumed use detector 522, but also the detection of a full rotation of the crankarm provided in particular by the accelerator 518, so as to prevent the power detector 500 from turning on upon false activations of the presumed use detector.

In any case, the accelerometer 518 forms part of the wake unit 1000 since it is used as actual use detector, to keep the system in running mode so long as it detects the rotation of the crankarm—besides of course performing its own role of cadence detector of the power meter 500.

Figure 12:
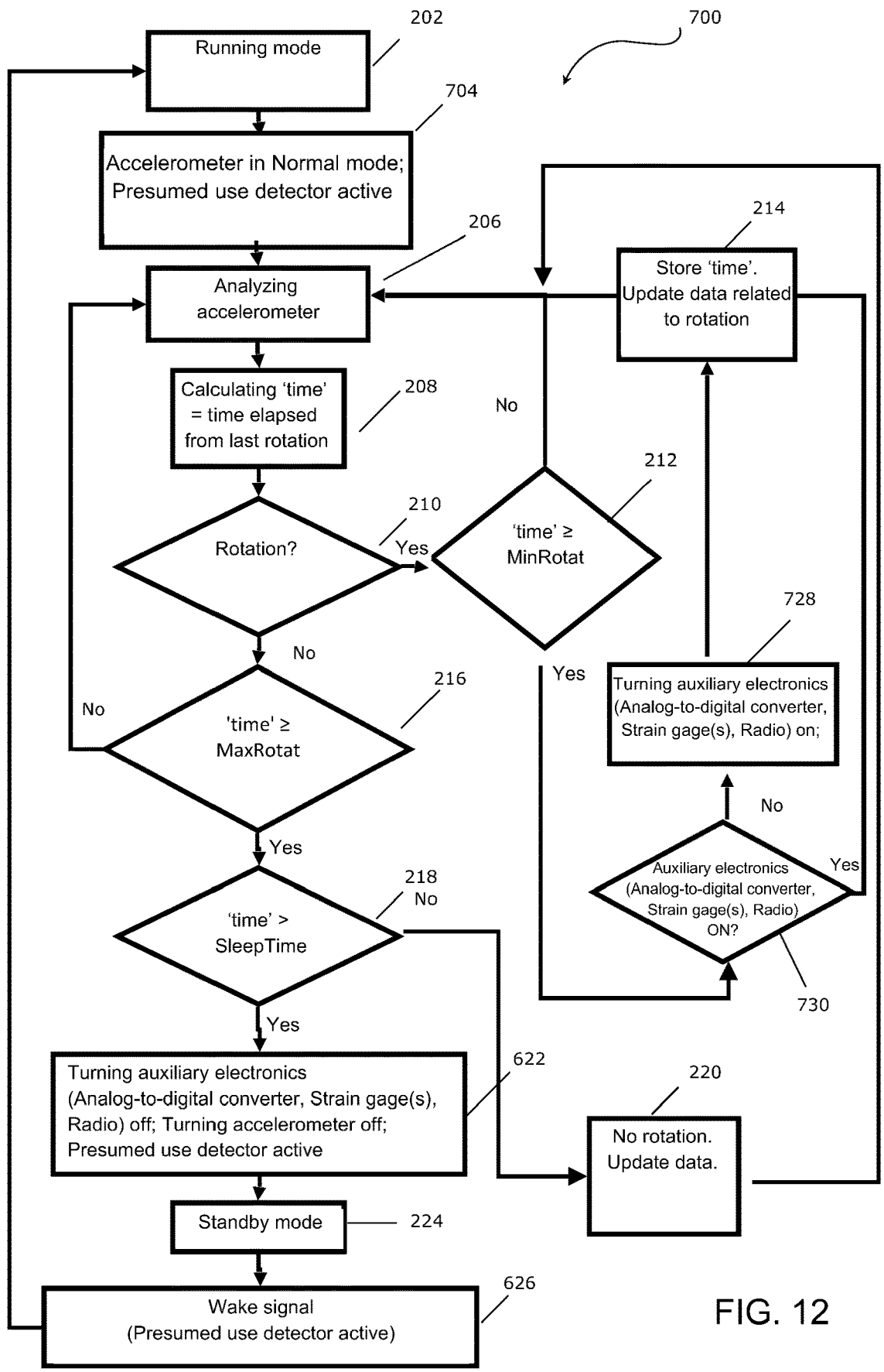
FIG. 12 shows a flow chart relative to the operation of the electric/electronic system of FIG. 10, according to a second embodiment thereof.

FIG. 12 shows a flow chart 700 relative to the operation of the power meter 500, according to a respective second embodiment. The flow chart 700 also represents a program executed in the processor 506, and it is described here only in how it differs from the flow chart 600 of FIG. 11. In particular, the differences are the same that distinguish the flow chart 300 of FIG. 8 from the flow chart 200 of FIG. 7.

Block 604 is replaced by a block 704 in which the processor 506 only takes care of placing the accelerometer 518 in normal running mode and of turning the presumed use detector 522 on or keeping it turned on.

The processor 506 takes care of turning the auxiliary electronics on (in particular the analog-to-digital converter 512, the strain gages and related reading control unit 510, and the radio 520 are turned on) only in a block 728 executed when in block 212 the processor 506 checks that the time 'time' is greater than or equal to the minimum threshold value MinRotat, after in block 210 it has detected a new rotation. Auxiliary electronics turn-on block 728 is carried out before block 214 in which the processor 506 stores the time 'time' and takes care of updating the data relative to the rotation of the crankarm.

Block 728 is not executed if the auxiliary electronics is already turned on, as checked in a block 730 arranged between block 212 and block 728.

Figure 13:
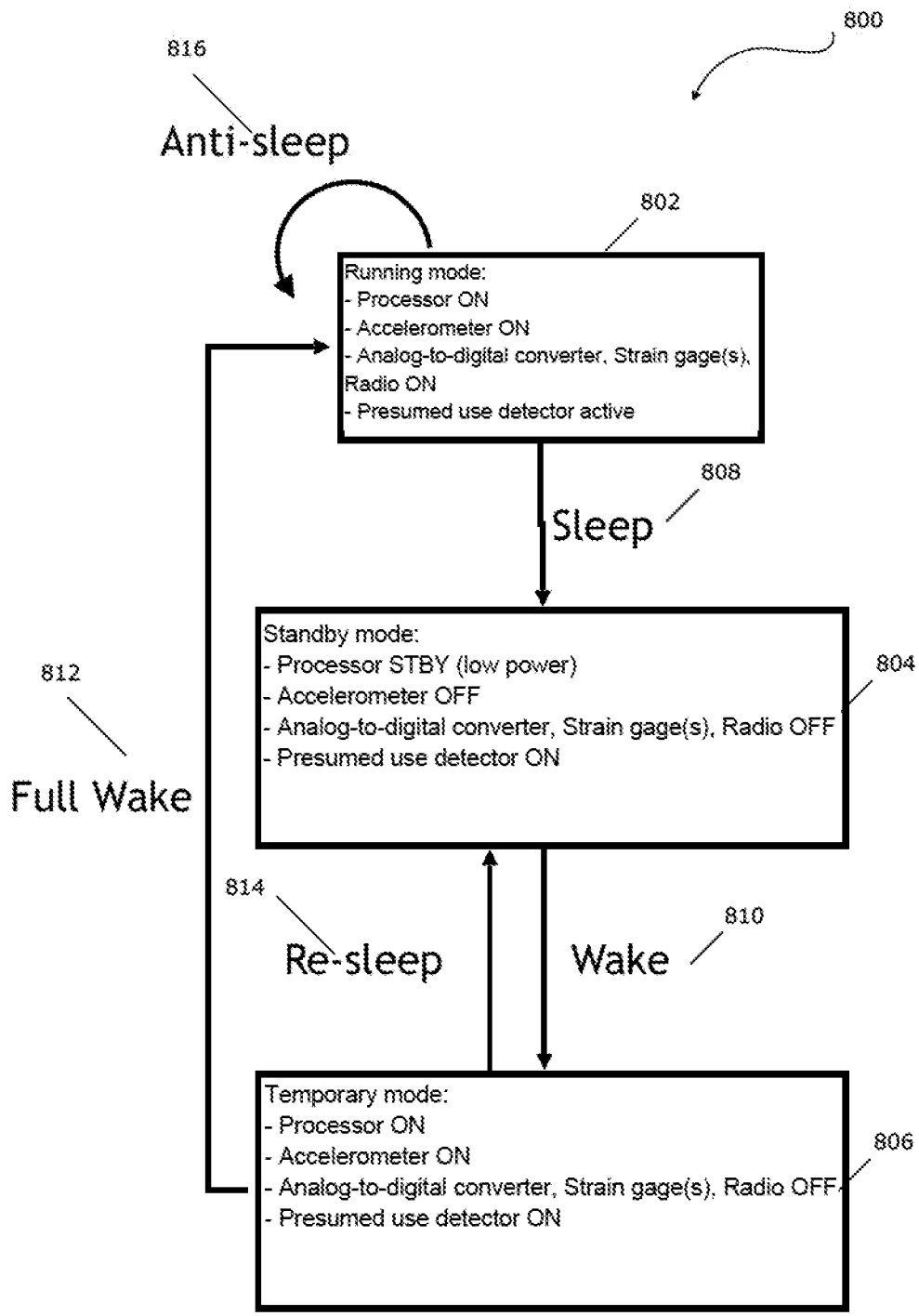
FIG. 13 shows a state diagram relative to the electric/electronic system of FIG. 6 when operated with the method of FIG. 12.

FIG. 13 shows a state diagram relative to the power meter 500 when operated with the method of FIG. 11.

In a running mode 802 of the power detector 500, the processor 506 is in running mode, the accelerometer is in (normal or sole) running mode, and the auxiliary electronics (analog-to-digital converter 512, strain gages and related reading control unit 510, radio 520) is turned on. Furthermore, the presumed use detector 522 is turned on. The energy consumption is the maximum. In this mode, the power detector 500 collects the torque and cadence data, and possibly transmits them to an external processor (the accelerometer 518 plays its role of cadence meter of the power meter 100). In this mode, furthermore, the power detector 500 preferably ignores the torque and cadence data if the cadence lies outside of a predetermined cadence range corresponding to a rotation time delimited by the extremes MinRotat and MaxRotat. As stated above, the accelerometer 518 also plays its role of actual use detector of the wake unit 1000, to keep the system in running mode so long as it detects the rotation of the crankarm.

In a standby mode 804 of the power detector 500, the processor 506 is in standby or low-power mode, the accelerometer 518 is turned off, and the auxiliary electronics (analog-to-digital converter 512, strain gages and relative reading control unit 510, radio 520) is turned off. Only the presumed use detector 522 is turned on. The energy consumption is the minimum.

In a temporary mode 806 of the power detector 500, the processor 506 is in running mode, the accelerometer 518 is in (normal or single) running mode, and the auxiliary electronics (analog-to-digital converter 112, strain gages and related reading control unit 110, radio 120) is turned off. Furthermore, the presumed use detector 522 is turned on. The energy consumption is still fairly low.

The event or signal that determines the transition from the state of running mode 802 to the state of standby mode 804 is indicated as Sleep signal and corresponds to the elapsing of the sleep time SleepTime without the detection of any rotation by the processor 506 through the accelerometer 518, in its role of actual use detector of the wake unit 1000.

The event or signal that determines the transition from the state of standby mode 804 to the temporary state 806 is indicated as wake signal Wake and corresponds to the output signal of the presumed use detector 522 of the wake unit 1000.

The event or signal that determines the transition from the state of temporary mode 806 to the state of running mode 802 is indicated as full wake signal Full Wake, and corresponds to the detection of a suitable pedaling cadence, provided by the accelerometer 518 in its role of actual use detector. It should be emphasized that the temporary mode 806 allows the vibrations or other movements detected by the presumed use detector 522 to be ignored in conditions in which in reality the bicycle is not being used by the cyclist, avoiding entering needlessly into full running mode 402 of the power detector 100.

Therefore, it is also possible for the system to go back from the state of temporary mode 806 to the state of standby mode 804, i.e. without turning the auxiliary electronics on; the relative transition being indicated as Re-Sleep 814 and corresponding to the detection of the presumed use signal by the presumed use detector 522, but not of the actual use signal by the accelerometer 518 in the role of part of the wake unit 1000. This situation occurs when the bicycle is displaced/moved without there being the rotation of the crankarm, for example when it is transported on a bicycle carrier of a car and is subjected to the stresses by the wind.

For the sake of completeness, the permanence in the running mode 802 is also indicated, as Anti-sleep 816, corresponding to continued pedaling.

The state diagram relative to the power meter 500 when operated with the method of FIG. 11 is a simplification wherein the temporary mode 806 and the full wake signal Full Wake 812 are absent, the wake event or signal Wake directly determining the transition from the state of standby mode 804 to the state of running mode 802, as will be clear to those skilled in the art upon reading the present description.

FIG. 14 illustrates a block diagram of an electric/electronic system provided with wake unit 1000, which in the case shown is representative of a torque or power meter 900, incorporated in a bicycle crankarm according to a second embodiment of the present invention. In particular, it relates to a power meter in the case in which the accelerometer is present, indicated herein with 918; on the other hand, it relates to a torque meter if the accelerometer 918 is absent.

The power meter 900 differs from the power meter 500 of FIG. 10 in that it comprises not only a presumed use detector 922 distinct from the accelerometer 918 (if present), but also an actual use detector 924 distinct from the accelerometer 918 (if present). The accelerometer 918 (if present) is not therefore part of the wake unit 1000.

The other components of the torque or power meter 900 are indicated with the same reference numerals increased by 400, so that a battery power unit 902, electric/electronic components 904, a processor 906, a stress/strain detector 908, one or more strain gages and related reading control unit, globally indicated with reference numeral 910, an analog-to-digital converter 912, one or more temperature sensors and related reading control unit, globally indicated with reference numeral 914, a second analog-to-digital converter 916, the aforementioned accelerometer 918 and a communication device 920, in particular a radio 920, are indicated.

In this embodiment, since an entire wake unit 1000 completely incorporated in the crankarm and distinct from the accelerometer 918 is provided for, no low-power mode of the accelerometer is used, which could lack such a mode, besides possibly even be absent.

The presumed use detector 922 can be made from any of the devices listed above with reference to the presumed use detector 522, including a second (or single) accelerometer, dedicated to such a function.

The actual use detector 924 can, as stated above, be made from a magnetic field sensor, from a position sensor or from a force and/or pressure and/or mechanical stress sensor; also in this case it is however possible in principle to use a tilt sensor or another accelerometer.

The operation of the electric/electronic system 900 will be clear to those skilled in the art in light of the present description.

Essentially, the output signal of the presumed use detector 922 still determines the passage from the standby mode (cf. block 224 of FIGS. 11 and 12) to the running mode (cf. block 202 of FIGS. 11 and 12), in a block totally analogous to block 626 of FIGS. 11 and 12.

The output signal of the actual use detector 924 is used for the purpose of fully waking (Full Wake signal analogous to the signal 812 of FIG. 13) and of maintaining the running mode (Anti-sleep signal analogous to the signal 816 of FIG. 13), and therefore for generalization of block 210 of FIGS.

11 and 12, since the rotation of the crankarm or the stress state on the crankarm determined by pedaling or one of the other conditions described above is again checked. It is also clear that in case rotation information of the crankarm is in any case present, provided by the actual use detector 924 or by the accelerometer 918 if present, it is still possible to subordinate the collection of data (cf. block 214 of FIGS. 11 and 12) of the torque or power meter 900, and possibly the turning on of the auxiliary electronics (cf. block 728 of FIG. 12), to the evaluation that the pedaling cadence is in the predetermined cadence range indicated by the rotation times MinRotat and MaxRotat of the blocks 212 and 216 of FIGS. 11 and 12.

In the various embodiments, the components of the auxiliary electronics (strain gages 110, 510, 910, analog-to-digital converter 112, 512, 912 and radio 120, 520, 920) are always managed in the same way, but this is not strictly necessary. In particular in the case of FIGS. 8 and 12, it is possible to wait to turn on only the radio 120, 520, which consumes the most.

In the various embodiments, the power meter could be replaced by a torque meter, or act additionally as torque meter or act only as cadence meter.

Those skilled in the art will also understand that the power meter 100, 500, 900 is representative of an electric/electronic system with which a crankarm can be provided.

It should again be emphasized that in other embodiments, the wake unit 1000 could comprise only one of the presumed use detector and the actual use detector. In the case of a power meter provided with accelerometer, each one of the presumed use detector and the actual use detector, where provided for, can be outside of the accelerometer or be made by the accelerometer, but by another of its detection axes, as stated above.

Each one of the presumed use detector and the actual use detector could comprise more than one of the detection devices listed above, for example plural tilt sensors.

It should be emphasized that the crankarm described above is advantageously totally autonomous, since it does not require any other element outside of the crankarm itself for its operation.

Furthermore, when it is manufactured with the process illustrated with reference to FIGS. 2-5, at least most of the components of the electric/electronic system (excluding for example only the battery power unit 102, 502, 902) are advantageously integrated in said crankarm. In the present description and in the attached claims, under "integrated" it is meant to be indicated that the crankarm is molded, in a single piece, with such components of the electric/electronic system already inserted thereinside.

The crankarm and such a majority of the components of the electric/electronic system therefore constitute a monolithic component. In the present description and in the attached claims, under "monolithic" component even a complex structure, still made of parts joined together and not detachable from each other without damaging at least one of them, is meant to be indicated.

The above is a description of various embodiments of inventive aspects, and further changes can be made without departing from the scope of the present invention. The shape and/or size and/or location and/or orientation of the various components and/or the succession of the various steps can be changed. The functions of an element or module can be carried out by two or more components or modules, and vice-versa. Components shown directly connected to or contacting each other can have intermediate structures arranged in between them. Steps shown directly following each other can have intermediate steps carried out between them. The details shown in a figure and/or described with reference to a figure or to an embodiment can apply in other figures or embodiments. Not all of the details shown in a figure or described in a same context must necessarily be present in a same embodiment. Features or aspects that turn out to be innovative with respect to the prior art, alone or in combination with other features, should be deemed to be described per se, irrespective of what is explicitly described as innovative.

What is claimed is:

1. A bicycle crankarm comprising:
   an electric/electronic system including a battery power unit, a processor having a standby mode and a running mode, and a wake unit that emits a wake signal for the processor,
   wherein said wake unit is powered by said battery power unit, is completely contained within the crankarm, and operates independently of any other element external to the crankarm.

2. The crankarm according to claim 1, wherein said wake unit comprises a bicycle presumed use detector.

3. The crankarm according to claim 2, wherein the bicycle presumed use detector is selected from the group consisting of:
   at least one vibration sensor comprising at least one accelerometer or at least one ball-in-cage switch;
   at least one tilt sensor;
   at least one self-contained magnetic field sensor;
   at least one barometer;
   at least one position and/or movement sensor; and
   at least one force and/or pressure and/or mechanical stress sensor.

4. The crankarm according to claim 1, wherein said wake unit comprises a crankarm actual use detector.

5. The crankarm according to claim 4, wherein said wake unit comprises a bicycle presumed use detector, and wherein the presumed use detector and the actual use detector are embodied by a same component of the wake unit.

6. The crankarm according to claim 5, wherein said same component has a normal running mode and a low-power running mode, in the normal running mode acting as the presumed use detector and as the actual use detector, and in the low-power running mode acting as the presumed use detector.

7. The crankarm according to claim 6, wherein the processor is configured to:
   after entering into the running mode, place said same component in the normal running mode, and,
   before entering into the standby mode, place said same component in the low-power running mode.

8. The crankarm according to claim 4, wherein said crankarm actual use detector is selected from the group consisting of:
   at least one vibration sensor comprising an accelerometer or a ball-in-cage switch;
   at least one tilt sensor;
   at least one self-contained magnetic field sensor;
   at least one barometer;
   at least one position and/or movement sensor; and
   at least one force and/or pressure and/or mechanical stress sensor.

9. The crankarm according to claim 1, further comprising a communication module and/or a stress/strain detector, the stress/strain detector comprising at least one strain gauge and related reading control unit and at least one analog-to-digital converter, wherein the processor is configured to turn the communication module and/or the stress/strain detector on after having entered into the running mode, and to turn the communication module and/or the stress/strain detector off before entering into the standby mode.

10. The crankarm according to claim 9, wherein the processor is configured to turn the communication module and/or the stress/strain detector on when the processor detects a rotary movement of the crankarm at a cadence below a predetermined maximum cadence, respectively a rotary movement time greater than a predetermined minimum movement time (MinRotat).

11. The crankarm according to claim 1, wherein the processor detects a rotary movement of the crankarm based on an output signal of an actual use detector within said wake unit.

12. The crankarm according to claim 11, wherein the processor is configured to enter into standby mode when the processor does not detect any rotary movement of the crankarm for a time longer than a first threshold value,
the processor is configured to enter into standby mode when the processor does not detect any rotary movement of the crankarm for a time longer than a first threshold value (MaxRotat) and a second threshold value (SleepTime) greater than the first threshold value (MaxRotat); and/or
wherein the processor is configured to stay in running mode when the processor does not detect any rotary movement of the crankarm for a time longer than a first threshold value (MaxRotat), but shorter than the second threshold value (SleepTime).

13. The crankarm according to claim 11, wherein the processor is configured to ignore cadence, torque or power data when the processor detects a rotary movement of the crankarm at a cadence greater than a predetermined maximum cadence, respectively a rotary movement time shorter than a predetermined minimum rotary movement time (MinRotat).

14. The crankarm according to claim 1, wherein said wake signal of the processor comprises an interrupt signal generated by a presumed use detector of the wake unit, when the presumed use detector detects a movement above a predetermined minimum movement threshold (MinAccel).

15. The crankarm according to claim 1, wherein the crankarm comprises an accelerometer and the processor is configured to measure a rotation cadence of the crankarm based on an output signal of the accelerometer, said wake unit comprises said accelerometer and said wake signal of the processor is given by an interrupt signal generated by the accelerometer, when the accelerometer detects an acceleration along at least one axis thereof above a predetermined acceleration threshold (MinAccel).

16. The crankarm according to claim 15, wherein said wake unit controls the passages of state of the electric/electronic system between:
(i) a running mode and a standby mode, or (ii) a running mode, a standby mode, and a temporary mode, based on an output signal of the accelerometer.

17. A bicycle crankarm comprising:
an electric/electronic system including:
a battery power unit,
a processor having a standby mode and a running mode, and
a wake unit that emits a wake signal for the processor, the wake unit comprising:
a bicycle presumed use detector, and;
a crankarm actual use detector,
wherein said wake unit is completely supported by or in the crankarm, and
the processor after entering into the running mode, turns the actual use detector on, and, before entering into the standby mode, turns the actual use detector off.

18. A bicycle crankarm comprising:
an electric/electronic system including a battery power unit, a processor having a standby mode and a running mode, and a wake unit that emits a wake signal for the processor,
wherein said wake unit is completely supported by or in the crankarm, wherein the crankarm is monolithic and made of composite material comprising structural fiber incorporated in a polymeric matrix, the crankarm being co-molded with a printed circuit board carrying said wake unit.

19. Bicycle crankarm provided with an electric/electronic system, including a battery power unit, a processor having a standby mode and a running mode, and a wake unit that emits a wake signal for the processor, wherein said wake unit is completely supported by or in the crankarm,
wherein the wake unit comprises a bicycle presumed use detector and a crankarm actual use detector embodied by a same component of the wake unit, said same component having a normal running mode and a low-power running mode, in the normal running mode acting as presumed use detector and as actual use detector, and in the low-power running mode acting as presumed use detector.

* * * * *